(12) United States Patent
Hofmann

(10) Patent No.: US 10,036,308 B2
(45) Date of Patent: Jul. 31, 2018

(54) METHOD FOR OPERATING A COMBUSTION ENGINE AND COMBUSTION ENGINE FOR CARRYING OUT THE METHOD

(71) Applicant: Arno Hofmann, Gelnhausen (DE)

(72) Inventor: Arno Hofmann, Gelnhausen (DE)

(*) Notice: Subject to any disclaimer, the term of this patent is extended or adjusted under 35 U.S.C. 154(b) by 0 days.

(21) Appl. No.: 15/021,107

(22) PCT Filed: Aug. 28, 2014

(86) PCT No.: PCT/EP2014/068284
§ 371 (c)(1),
(2) Date: Mar. 10, 2016

(87) PCT Pub. No.: WO2015/036259
PCT Pub. Date: Mar. 19, 2015

(65) Prior Publication Data
US 2016/0215684 A1    Jul. 28, 2016

(30) Foreign Application Priority Data

Sep. 10, 2013   (EP) ................................. 13183821
Feb. 26, 2014   (EP) ................................. 14156867

(51) Int. Cl.
*F02B 33/44*   (2006.01)
*F02B 35/00*   (2006.01)
(Continued)

(52) U.S. Cl.
CPC ............ *F02B 33/42* (2013.01); *F02B 27/003* (2013.01); *F02B 33/32* (2013.01); *F02B 37/164* (2013.01);
(Continued)

(58) Field of Classification Search
CPC ........ F02B 33/42; F02B 33/32; F02B 37/165; F02B 27/003; F04B 43/0054; F04B 45/04;
(Continued)

(56) References Cited

U.S. PATENT DOCUMENTS 2,849,992 A * 9/1958 Stillebroer .......... F02B 19/1085
                                                60/605.1
3,106,821 A * 10/1963 Ridgway .................. F01N 3/30
                                                417/380
(Continued)

FOREIGN PATENT DOCUMENTS

BE         447895 A      11/1942
CN      202718750 U       2/2013
(Continued)

OTHER PUBLICATIONS

Partial European Search Report for European Patent Application No. 13183821.1, dated Mar. 4, 2014, 6 pages.
(Continued)

*Primary Examiner* — Thai Ba Trieu
(74) *Attorney, Agent, or Firm* — Withrow & Terranova, PLLC

(57) ABSTRACT

In a method for operating a combustion engine in which exhaust gas located in a cylinder during an outlet cycle thereof is ejected from the cylinder and supplied to an exhaust system, a particularly high specific power output of the combustion engine and/or a particularly low specific fuel consumption are to be made possible, in a particularly simple and reliable manner. For this purpose, according to the invention, in a first cycle phase of the outlet cycle the pulse of the exhaust gas pressure wave flowing out of the cylinder is transmitted in whole or in part to the primary side of an exhaust gas charge pump, before the exhaust gas is (Continued)

Figure 1:
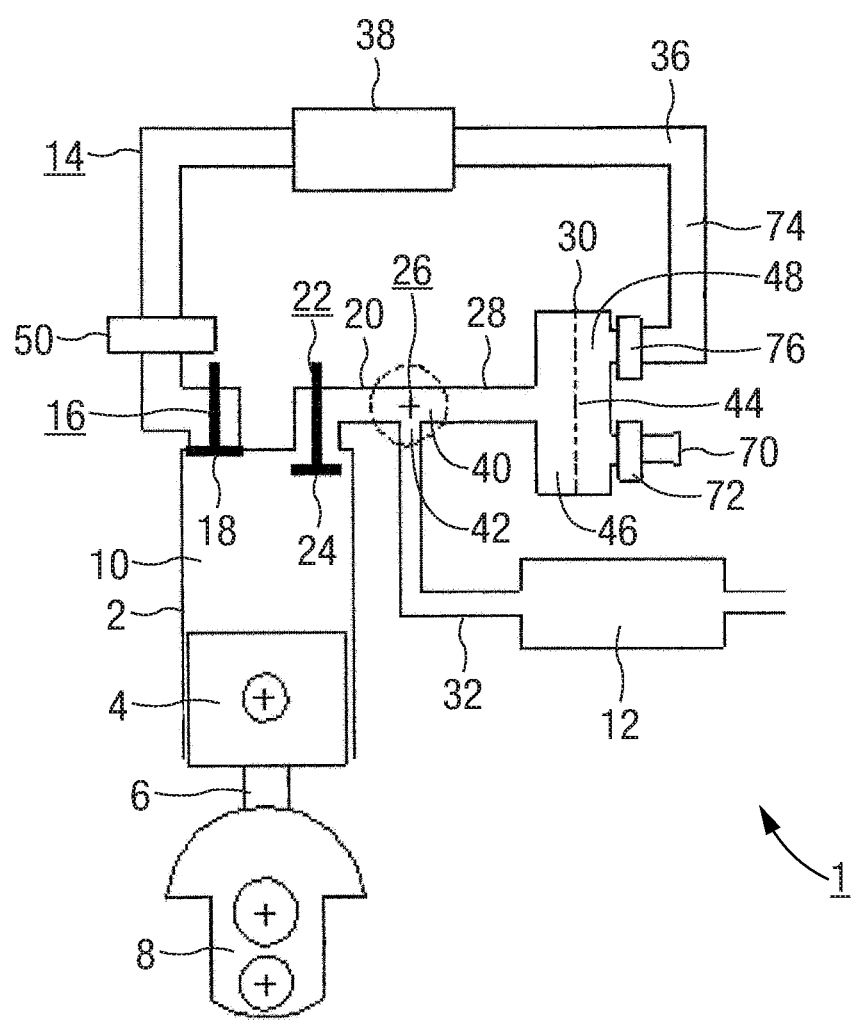

passed to the exhaust system in a second cycle phase of the outlet cycle.

5 Claims, 15 Drawing Sheets

(51) Int. Cl.
    *F02B 27/02*     (2006.01)
    *F02B 33/42*     (2006.01)
    *F02B 27/00*     (2006.01)
    *F02B 33/32*     (2006.01)
    *F02B 37/16*     (2006.01)
    *F04B 43/00*     (2006.01)
    *F04B 45/04*     (2006.01)
    *F04B 45/053*     (2006.01)

(52) U.S. Cl.
    CPC .......... *F04B 43/0054* (2013.01); *F04B 45/04* (2013.01); *F04B 45/043* (2013.01); *F04B 45/053* (2013.01); *Y02T 10/144* (2013.01); *Y02T 10/146* (2013.01)

(58) Field of Classification Search
    CPC .... F04B 45/043; F04B 45/053; Y02T 10/144; Y02T 10/146
    USPC ................................ 60/605.1, 606, 314–315
    See application file for complete search history.

(56) References Cited

U.S. PATENT DOCUMENTS

| | | | | |
|---|---|---|---|---|
| 3,498,054 A * | 3/1970 | Theed | ........................ | F01N 3/22 60/290 |
| 3,646,701 A * | 3/1972 | Pfaffenbach | .......... | A01M 13/00 417/380 |
| 4,093,403 A * | 6/1978 | Schrimpf | .............. | F04B 43/026 417/246 |
| 4,502,848 A * | 3/1985 | Robertson | ............. | F04B 35/002 417/380 |
| 4,797,070 A * | 1/1989 | Schatz | .................... | F02B 33/42 417/380 |
| 4,884,405 A | 12/1989 | Schatz | | |
| 4,922,714 A * | 5/1990 | Grob | .................... | G01N 21/534 60/276 |
| 5,902,971 A * | 5/1999 | Sato | .......................... | F01N 1/14 60/299 |
| 6,216,453 B1 * | 4/2001 | Maurer | ..................... | F01N 3/32 60/304 |
| 8,826,646 B2 * | 9/2014 | Waletzek | .............. | F04B 35/045 417/212 |
| 9,261,090 B2 * | 2/2016 | Haeberer | ................ | F04B 43/04 |

FOREIGN PATENT DOCUMENTS

| | | | | |
|---|---|---|---|---|
| DE | 1003503 B | 2/1957 | | |
| DE | 3131805 A1 | 3/1983 | | |
| DE | 3318136 A1 | 11/1984 | | |
| DE | 3625048 A1 | 2/1988 | | |
| DE | 3625050 A1 | 2/1988 | | |
| DE | 3625051 A1 | 2/1988 | | |
| DE | 3625053 A1 | 2/1988 | | |
| DE | 3631746 A1 | 4/1988 | | |
| DE | 19717094 C1 | 6/1998 | | |
| DE | 102011107692 B3 | 1/2013 | | |
| DE | 102012016247 A1 | 3/2013 | | |
| DE | 102012018785 A1 | 3/2013 | | |
| DE | 102012216283 A1 * | 3/2014 | ............. | F01N 3/208 |
| EP | 3061970 A1 * | 8/2016 | ............. | F02B 33/42 |
| FR | 551314 A * | 4/1923 | ............ | F04B 45/043 |
| FR | 1031061 A | 6/1953 | | |
| FR | 2444819 A1 * | 7/1980 | ............ | F04B 45/022 |
| FR | 2927131 A1 * | 8/2009 | ............. | F04B 43/04 |
| GB | 201664 A * | 8/1923 | ................ | C10J 3/80 |
| GB | 2010385 A * | 6/1979 | ............. | F04B 43/06 |
| JP | S58173727 U | 11/1983 | | |
| JP | S63140821 A | 6/1988 | | |
| JP | H0560041 A | 3/1993 | | |
| JP | H08246890 A | 9/1996 | | |
| JP | 2011208644 A | 10/2011 | | |
| WO | WO 2017041949 A1 * | 3/2017 | ............. | F02B 33/02 |

OTHER PUBLICATIONS

European Search Report for European Patent Application No. 13183821.1, dated Jun. 20, 2014, 12 pages.
Examination Report for European Patent Application No. 13183821.1, dated Jan. 28, 2016, 6 pages.
Partial European Search Report for European Patent Application No. 14156867.5, dated Nov. 20, 2014, 6 pages.
European Search Report for European Patent Application No. 14156867.5, dated Apr. 20, 2015, 12 pages.
Examination Report for European Patent Application No. 14156867.5, dated Jan. 28, 2016, 6 pages.
International Search Report and Written Opinion for International Patent Application No. PCT/EP2014/068284, dated Jan. 15, 2015, 23 pages (English Translation attached).
Schatz, O., et al., "Pulse charging—a new approach for dynamic charging," Second International Conference on New Development Powertrain Chassis, England, 1989, 16 pages.
Examination Report for European Patent Application No. 14156867.5, dated Feb. 27, 2017, 4 pages.
First Office Action for Chinese Patent Application No. 201480048454.4, dated Oct. 11, 2017, 11 pages.
Examination Report for European Patent Application No. 14765885.0, dated Jan. 30, 2018, 7 pages.

* cited by examiner

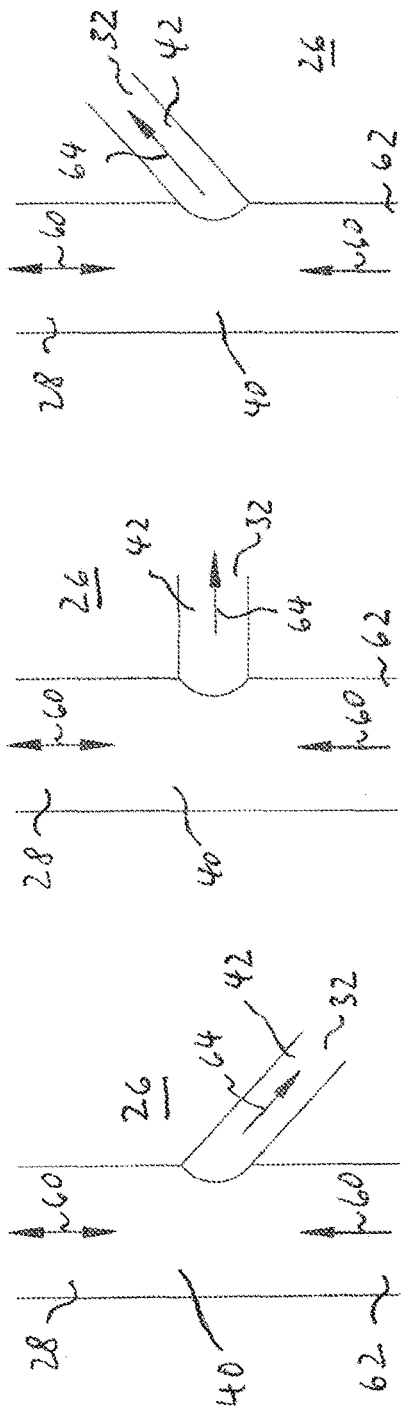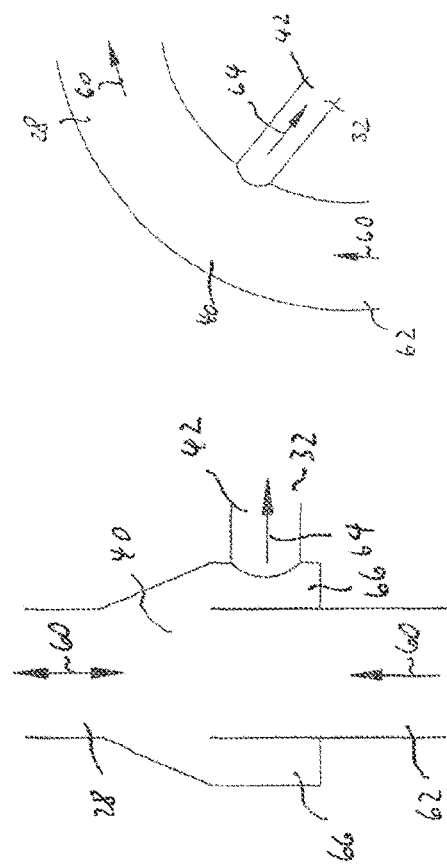

METHOD FOR OPERATING A COMBUSTION ENGINE AND COMBUSTION ENGINE FOR CARRYING OUT THE METHOD

This patent application is a 35 U.S.C. § 371 national phase filing of International Application No. PCT/EP2014/068284, filed Aug. 28, 2014, which claims priority to European Patent Application No. 14156867.5, filed Feb. 26, 2014 and European Patent Application No. 13183821.1, filed Sep. 10, 2013, the disclosures of each of which are hereby incorporated herein by reference in their entireties.

The invention relates to a method for operating a combustion engine in which exhaust gas located in a cylinder during an outlet cycle thereof is ejected from the cylinder and supplied to an exhaust system. It further relates to a combustion engine comprising a number of cylinders in each of which a working piston, acting on a shared crankshaft, is guided, the combustion chamber of the or each cylinder being connected to a gas inlet system via an actuable inlet valve system on the inlet side and to an exhaust system via an actuable outlet valve system on the outlet side. It further relates to an exhaust gas charge pump, in particular for use in a combustion engine of this type.

Combustion engines or heat engines are put to various uses in a wide range in fields, for example as drive units of motor vehicles or else in a stationary configuration in industrial plants or other technical facilities. A combustion engine or a heat engine may operate using petrol or diesel, using two or four cylinders, and using various liquid or gaseous fuels. In all of the various constructions, a compressed fuel-air mixture is usually caused to explode in a combustion chamber of a cylinder (or in a disc chamber for an analogous configuration for a rotary engine), in such a way that, as a reaction, a piston arranged displaceably in the cylinder in question performs a working stroke and thus drives an engine shaft to provide power. After the working stroke is complete, in other words after the expansion of the combusted working gas in the cylinder, the combusted working gas is supplied, during an outlet cycle of the cylinder in question, as exhaust gas to an exhaust system connected to said cylinder on the outlet side.

In a conventional construction, the combustion engine may be configured as a 4-stroke engine, in which the exhaust gas system leading into the exhaust system is opened by way of an outlet valve arranged in the cylinder. However, in an alternative conventional construction, the combustion engine may also be configured as a 2-stroke engine, in which the outlet cycle is configured as part of the actual working stroke, the exhaust gas system which opens into the exhaust system being opened in a slot-controlled manner, in that the piston, in the end phase of the stroke movement thereof, slides away over outlet slots arranged in the cylinder and subsequently opens them. In 4-stroke engines, a corresponding inlet valve system is usually likewise provided on the gas inlet side, whereas in 2-stroke engines this functionality is likewise provided in the form of scavenging slots arranged in the cylinder casing. Further, there are valve systems based on rotary slides, in which duct cross sections in the cylinder head are opened and closed by rotating rotary slides. Rotary slide control systems are used for two-stroke and four-stroke methods. Therefore, in the case of 2-stroke engines, the terms "inlet valve system" and "outlet valve system" used as representative in the following therefore explicitly also refer to the corresponding slot arrangements in the cylinder casing, by way of which the corresponding valve functions are provided analogously to the actual implementation in 4-stroke engines by way of poppet valves or rotary slides.

For combustion engines or heat engines of any construction (for example including Stirling engines, steam engines, etc.), it has for some time been aimed for, as a configuration goal, to increase the usable power output per unit cylinder capacity of each cylinder and/or to increase the efficiency/reduce the specific fuel consumption. In view of these configuration goals, some designs have been developed for exploiting or recovering the residual energy carried in the exhaust gas flowing out of the cylinder.

These include exhaust gas turbocharging. Exhaust gas turbocharging draws enthalpy from the exhaust gas flow and supplies this back to the engine in the form of compression work in a fresh gas flow. In view of the properties of a continuous-flow machine, exhaust gas turbocharging has high efficiencies assuming the presence of a continuous exhaust gas enthalpy flow. The greater the stochastic fluctuations in the exhaust gas enthalpy flow become, the worse the efficiency of the turbine turns out. This means that, in practice in cylinder engines, exhaust gas turbochargers only have good efficiencies in the case of three or more cylinders, are only usable in two-cylinder engines in some cases (preferably in the case of a symmetrical firing sequence), and cannot be operated efficiently in single-cylinder engines.

In principle, combustion engines having small cylinder capacities require small blade diameters in the turbine and compressor. Both the turbine efficiency and the compressor efficiency decrease with smaller blade diameters, since among other things the gap losses between the blades and the housing increase disproportionately. The response characteristic (dynamic behaviour) of exhaust gas turbochargers is also found to be unfavourable in the event of load steps in the combustion engine, since starting from a low load (low exhaust gas enthalpy) the gradual rise in enthalpy upstream from the turbine only accelerates the rotor in a delayed manner because of the mass inertia thereof, and this, in the form of turbo lag, leads in a known manner to a slow pressure increase on the compressor side. This effect is more pronounced in engines having a low cylinder capacity, since the mass moment of inertia of the rotor does not decrease as much as the exhaust gas enthalpy flow, and is more pronounced in petrol engines than in diesel engines because of the wider spread of the exhaust gas enthalpy. It is therefore barely possible to operate small, dynamically driven engines, such as in vehicles and power-controlled block heating stations, using exhaust gas turbochargers.

The compression wave charger conceivable as an alternative is a charging system which, like the exhaust gas turbocharger, draws enthalpy from the exhaust gas flow and supplies it as compression work to the combustion air being sucked in. The compression wave charger has good dynamic behaviour and high supercharging rates even at low engine speeds. The "open" gas exchange system between the exhaust gas and the fresh air is found to be disadvantageous in that the charger has to be bypassed during engine start-up to prevent scavenging short circuits, and also does not tolerate any throttling of the suction air, meaning that the charger appears unsuitable for dynamically operated petrol engines in operation at partial load. The acoustic properties are also problematic because of the direct connection of the exhaust gas line and fresh gas line. The high installation volume and weight and the need to drive the charger synchronously with the engine speed make the compression wave charger uneconomical for low-volume petrol engines.

A further option for converting exhaust gas enthalpy into useful work can be provided by expanding the exhaust gas from the operating cylinder of a combustion engine again in a further expansion cylinder. Among others, the publications of Mario Illien and Gerhard Schmitz (http://www.5-takt-motor.com/de/News.html) disclose a system of this type, which couples two high-pressure cylinders, operating in a four-stroke method and with the same firing sequence, to a low-pressure cylinder of a larger cylinder capacity, operating at a 180° crankshaft offset. When a high-pressure cylinder reaches bottom dead centre (BDC) after the working stroke, the outlet system thereof opens the duct to the low-pressure cylinder, which is at top dead centre (TDC). Because of the larger stroke volume of the low-pressure cylinder, the working gas expands further, even though the ascending piston of the high-pressure cylinder is reducing the volume thereof again.

Thermodynamically, this arrangement increases the expansion ratio in the combustion cycle, increasing the thermodynamic efficiency.

Drawbacks of systems having a separate low-pressure cylinder are the high thermal load on the overflow duct in the cylinder head, the higher exhaust gas counter pressure in the event of valve overlap (scavenging) of a high-pressure cylinder, the considerable increase in engine weight and installation space for the low-pressure cylinder, the friction losses (additional piston group and crankshaft drive) in the low-pressure cylinder, and the fact that the low-pressure cylinder which expediently operates in two-stroke operation is to be combined with two high-pressure cylinders having the same angular ignition spacing. The system costs turn out very high. This construction is therefore not promising for single-cylinder engines.

DE 36 25 050 A1, DE 36 25 048 A1, DE 36 25 051 A1, DE 36 25 053 A1, DE 33 18 136 A1 and the publication of Schatz et al., "Pulse Charging—a new approach for dynamic charging", Second International Conference New Development Powertrain Chassis, England 1989, disclose an exhaust gas pulse charger as a further alternative design for increasing the power or efficiency of a combustion engine. The exhaust gas pulse charger converts exhaust gas enthalpy from a combustion engine into compression work in fresh gas. The system consists of a free piston which is guided in a cylinder. One side of the cylinder is connected to the outlet system of the engine via an exhaust gas supply duct; the other side of the cylinder is connected to the inlet system. A spring pushes the free piston at the exhaust gas-side stop thereof in the cylinder, in such a way that the free piston, when not loaded with pressure, clears a maximum volume on the fresh gas side and accordingly a minimum volume on the exhaust gas side. The free piston optionally has a screening, centrally on the exhaust gas side thereof, which clears the exhaust gas cylinder volume from a particular free piston stroke to the exhaust gas outlet duct so as to pass the exhaust gas into the silencer, or a valve, which is controlled by the exhaust gas pressure in the exhaust gas charge pump and which opens and closes the exhaust gas outlet duct. The intention of controlling the exhaust gas outlet duct using a valve which moves independently of the free piston movement at least in part and which is driven by the exhaust gas is to make a longer expansion stroke of the free piston possible. On the fresh gas side, via a check valve, the cylinder volume may suck in ambient air, which is pushed into the inlet system of the engine when the volume is reduced.

The publication "Pulse Charging—a new approach for dynamic charging" discloses test results for the exhaust gas pulse charger on a two-cylinder engine. When an outlet valve of an engine cylinder opens, exhaust gas flows into the exhaust gas pulse charger and accelerates the free piston counter to the spring force. The exhaust gas performs expansion work in the exhaust gas pulse charger until the screening on the free piston opens the decompression duct. The mass inertia of the free piston allows it to continue in the cylinder until kinetic energy thereof has in total reached the potential energy of the spring and of the fresh air compressed by the free piston in the inlet system. As a result of the mutually symmetrical phase position of the two engine cylinders, the opening of the engine outlet valve of the first engine cylinder causes the free piston to move at the TDC piston position thereof, corresponding to a TDC piston position of the second engine cylinder shortly before the engine inlet valve closes, in such a way that part of the fresh air currently being compressed by the free piston is rapidly pushed into cylinder two upstream from the inlet end via the inlet system and the air density thereof is thus increased. The spring force and compressed fresh air in the inlet system push the free piston back into the rest position thereof, in other words as far as the exhaust gas-side stop thereof. After 360 crankshaft degrees, the operation cycle of the exhaust gas pulse charger starts from the front, but the two engine cylinders exchange the functions thereof with respect to the exhaust gas pulse charger.

In testing, the exhaust gas pulse charger exhibited good dynamic behaviour at low engine speeds (up to approximately 2000 rpm) and also an increase in air efficiency. At higher rotational speeds (from approximately 3000 rpm) there was no longer any increase in charge pressure.

The exhaust gas pulse charger has some thermodynamic and mechanical drawbacks which are detrimental to the efficiency and functionality thereof:

Significant harmful volumes on the exhaust gas side (short-circuit connection between exhaust gas supply duct and exhaust gas ejection duct), which reduce both the exhaust gas pressure upstream from the free piston and the end compression pressure in the inlet system.

The relatively short length of the shielding on the free piston, which releases the exhaust gas flow from the exhaust gas pulse charger into the silencer, only makes it possible to exploit a small part of the stroke of the free piston as a working stroke for decompressing the engine exhaust gases. For exploiting the energy of the exhaust gas pulse, too, on the one hand the high mass of the free piston with respect to the gas mass of the exhaust gas compression wave prevents a significant transfer of energy from exhaust gas to the free piston during the pulse transmission, and so the charge pressure increases turns out small, as confirmed by the tests. On the other hand, the direct connection of the exhaust gas exhaust line to the expansion chamber of the exhaust gas charge pump additionally leads to a pulse loss due to overflow.

The shielding of the free piston has to have not insignificant leakage when closed for the free piston to be able to move back into the rest position thereof after each operation cycle thereof. These leakage losses constitute a further pressure loss and thus energy loss.

On the one hand, controlling the exhaust gas outlet duct using a valve controlled by exhaust gas pressure and mass inertia involves very imprecise adherence to the exhaust gas valve timings (friction losses and natural vibration properties); on the other hand, using the proposed valve systems it is not possible to achieve approximately the thermodynamically ideal exhaust gas control diagram, in which the entire stroke of the free piston is exploited as a working stroke with a closed exhaust gas outlet duct, and the exhaust gas outlet duct is completely open when the free piston is returning. The existing mass inertias of the valve and of the free piston make the ideal exhaust gas control diagram impossible, since the accelerated masses require a delay line for reversing direction. The required configuration of the exhaust gas-driven valve actuation mechanism for a particular exhaust gas pressure means that the exhaust gas valve timings change counterproductively when the load and speed of the engine change. In particular, the exhaust gas-driven valve actuation mechanism does not respond to low exhaust gas pressures (low load, idle running), meaning that the exhaust gas pulse charger also does not perform any expansion work, even though relatively high exhaust gas enthalpies with respect to the specific engine work are available precisely in the partial load range in volume-controlled petrol engines, since the engine has a low effective compression ratio and correspondingly low expansion ratio when throttled. It is not possible to superpose the closing of the valve of the outlet duct, which is pressure-controlled and mass-inertia-controlled, simultaneously on the closing of the engine outlet valve over the load and rotational speed spreads occurring in the engine operation. In particular, in the documents cited herein, the closing of the valve of the outlet duct is exclusively based on the time of emptying the exhaust gas side of the exhaust gas pulse charger, and no correlation with the phase position or the closing of the engine outlet valve is disclosed.

The free piston and spring (including the pneumatic spring in the inlet tract) form a harmonic oscillator, the natural frequency of which is dependent on the moving masses (pistons, linear guide rod and half spring mass) and the spring rate. If this system approaches the natural frequency thereof, considerable amplitude peaks occur, which can cause the free piston to strike the stops thereof in the cylinder under a high acceleration. The foreseeably high masses of the moving components, which could be several hundred grams, and the necessarily weak spring forces, which have to make it possible for the free piston to move even at relatively low exhaust gas pressures (approximately 2 bar), make it obvious for the natural frequency of the system already to be reached at low engine operating speeds. Because the charging pressure of the exhaust gas pulse charger decreases quickly from 2000 rpm upwards in the described test engine, it can be concluded that the natural frequency of the system is already exceeded and the system no longer performs the full working stroke. When it exceeds its natural frequency, the free piston does not have sufficient time to return to its rest position. From approximately 3000 rpm upwards, charging pressure no longer builds up on the described test engine. Presumably, the free piston is positioned in the rest position at a half piston displacement.

Because of varying exhaust gas pressures and changing pneumatic spring return rates, the system of the free piston is not uniquely determined in terms of the natural frequency and piston stroke thereof, and so collisions of the free piston at the end positions thereof in the cylinder are to be expected.

Either the sealing of the free piston with respect to the cylinder wall has to be provided contactlessly across a gap, in such a way that significant leakage flows from the exhaust gas side to the fresh gas side will occur because of the large cylinder bore, or sealing elements, for example piston rings, are used, which will however require lubrication and produce increased friction.

The entire exhaust gas flow is passed through the exhaust gas pulse charger and thus contributes to a high thermal load on the charger housing and the free piston.

A further alternative design for increasing the power or efficiency of combustion engines is to place a vaporisation process (ORC) downstream. In this context, to make use of exhaust gas enthalpy or residual heat, vapour processes comprising piston or turbine expansion machines are provided, which are preferably operated using low-boiling organic working materials (ORC=Organic Rankine Cycle). These processes exclusively draw heat from the exhaust gas flow via heat exchangers. Because of the low temperature differences (physical working material confinement) in a single-stage process, the efficiencies are rarely higher than 15%. The thermal inertia of heat exchangers and line systems prevents good dynamic behaviour, and so these systems are not suitable for feeding mechanical power output directly into dynamically operated combustion engines. In particular the high system costs, which are currently more than EUR 3000/kW, prevent use in small engines.

Alternatively, thermoelectric energy conversion using the Seebeck effect may be provided. This effect describes the electrical potential difference between two bodies of different temperature due to differing electron gas densities in the crystal lattices of these bodies. The potential difference increases with the temperature difference between the bodies, and can be used to make an electric current flow. Using the exhaust gas of combustion engines, one of the bodies is heated, and the other is preferably kept at ambient temperature. The system works without any moving components, and is therefore not a machine.

The object of the invention is now to provide an alternative method for operating a combustion engine of the aforementioned type which makes possible, in a particularly simple and reliable manner, a particularly high specific power output of the combustion engine and/or a particularly low specific fuel consumption. A combustion engine particularly suitable for carrying out the method is also to be provided.

As regards the method, this object is achieved according to the invention in that in a first cycle phase of the outlet cycle the pulse and/or the pressure energy of the exhaust gas pressure wave flowing out of the cylinder is transmitted in whole or in part to the primary side of an exhaust gas charge pump, before the exhaust gas is passed to the exhaust system in a second cycle phase of the outlet cycle.

The total duration of the first and second cycle phases preferably approximately corresponds to the total opening time of the corresponding engine outlet valve, the start of the first phase accompanying the opening of the engine outlet valve and the end of the second phase approximately coinciding with the closing of the engine outlet valve or also being able to take place slightly delayed. A short first cycle phase reduces the wall thermal losses in the outlet duct and the exhaust gas charge pump and together with an early pressure reduction in the engine cylinder makes possible a correspondingly low expulsion work or low exhaust gas counter pressure during load change. The cycle phases occur in particular in that, as a result of a suitable flow conduction of the exhaust gas wave when the outlet valve is opened, the pulse of the exhaust gas flow and with this the pressure energy of the exhaust gas pressure wave is transmitted as completely as possible or at least in part to the primary side of the exhaust gas charge pump. In this phase, escape of exhaust gas into the exhaust system should be largely prevented. The desired pulse transmission from the exhaust gas pressure wave to the primary side of the exhaust gas charge pump may be provided in that the exhaust gas arrives in the exhaust gas charge pump directly at least in part; however, a direct pulse transmission is particularly preferred, in which the exhaust gas pressure wave flowing out of the cylinder transmits the pulse thereof in part or as completely as possible to a gas cushion already located in and/or upstream from the primary volume of the exhaust gas charge pump. Subsequently, this is followed by the second cycle phase of the outlet cycle, in which the exhaust gas flows to the exhaust system.

The invention is based on the consideration that the use of the residual enthalpy still carried along in the exhaust gas flowing out of the cylinder is to be selected as a particularly suitable starting point for an increase in the efficiency and/or power of the combustion engine, since in operation the exhaust gas flows out of the cylinder in question with a comparatively high residual pressure, which can be used for additional provision of power output before the exhaust gas is emitted to the environment, which is at ambient pressure.

The applications for the exhaust gas charge pump centre in particular on single-cylinder and two-cylinder combustion engines, which have relatively low individual cylinder volumes of approximately 50-250 cc. For these engine types, there is as yet no economically feasible system for converting (lost) exhaust gas energy into mechanical (drive) energy. The exhaust gas charge pump should preferably be operable efficiently using the following constraints on these engine types, or have the following properties:

- For engine speeds up to 10000 rpm (two-wheel engines)
- Efficiently convert even strong fluctuations in the exhaust gas mass flow (single-cylinder engines)
- The delivery rate of the fresh gas should be approximately proportional to the load and rotational speed
- Bring about low exhaust gas counter pressure in the expulsion cycle and during load change
- Complete separation of exhaust gas and fresh gas lines
- Good dynamic properties (vehicle application)
- Low inherent (frictional) losses
- Good acoustic properties (two-wheel engines)
- Low system costs
- Low-maintenance
- Subject to lowest possible thermal load
- Suitable for both petrol and diesel engines and also for two-stroke and four-stroke method So as to meet the requirements on exhaust gas enthalpy fluctuations, good dynamic behaviour, low cylinder capacities and a delivery rate proportional to the engine speed, the exhaust gas charge pump is preferably configured as a pump having an oscillating pump body, which provides an operation cycle synchronous with the exhaust gas pressure wave in the outlet duct of the engine cylinder connected thereto.

High operating frequency of the exhaust gas charge pump for high-speed engines, good dynamic behaviour, separation of the exhaust gas and fresh gas lines, low frictional losses and low maintenance levels are achieved in that the pump body is particularly preferably configured as a resiliently deformable, preferably minimum-weight dividing wall between an exhaust gas side and a fresh gas side of the exhaust gas charge pump. A minimum-weight dividing wall of this type also makes a high energy transfer possible in the event of pulse exchange from the gas to the dividing wall, since theoretically the maximum energy transfer takes place for an identical mass of the gas and the dividing wall. Preferably, the provided expansion work on the exhaust gas side of the exhaust gas pump is converted via the dividing wall into compression work in a fresh gas volume, which can be decompressed again elsewhere to provide power. However, the movement sequences of the dividing wall may also be exploited as mechanical energy or converted into electrical energy via a generator.

A reduced thermal load on the exhaust gas charge pump is achieved in terms of the method in that the exhaust gas exclusively flows into and out of the primary side of the exhaust gas charge pump through a duct. By contrast with the exhaust gas pulse charger, which is flowed through by the entire exhaust gas mass, on the one hand only a "displacement mass flow" having much lower flow speeds (lower heat transfer coefficients) occurs in the exhaust gas charge pump in the operation cycle, and on the other hand the exhaust gas expelled from the engine cylinder in the second cycle phase is not passed through the exhaust gas charge pump. In a particularly preferred configuration of this type, during the second phase of the outlet cycle the exhaust gas is thus supplied to the exhaust system whilst bypassing the exhaust gas charge pump.

As a result of the outlet cycle being divided into at least two sub-phases, it is thus provided that, in the first sub-phase, which is preferably comparatively short in time, the desired exploitation of the exhaust gas enthalpy can take place, whilst in the second sub-phase, which is preferably long by comparison with the first, the following gas exchange and scavenging processes of the engine cylinder in question can take place at the favourable pressure level of a suction engine. A particularly high efficiency, along with a low mechanical complexity, is thus achieved by the particularly preferred configuration in which, in the second sub-phase, the exhaust gas, which is now decompressed in part, from the primary side of the exhaust gas charge pump is supplied from the combustion chamber and to the exhaust system together with the residual exhaust gas. In this phase, the exhaust gas supplied to the primary side of the exhaust gas charge pump is thus particularly preferably fed back, in such a way that there is a flow to and subsequently back from, but not through, the exhaust gas charge passing through a branch duct. In the second cycle phase, the exhaust gas can thus be supplied to the exhaust gas system whilst bypassing the exhaust gas charge pump.

The enthalpy drawn from the exhaust gas in the exhaust gas charge pump can be converted in any desired manner into effective power or energy usable in the overall system of the combustion engine, for example via hydraulic, electric or similar systems. However, particularly favourable and above all flexible use of the enthalpy drawn from the exhaust gas using the exhaust gas charge pump is possible in that, in a particularly advantageous configuration, in the exhaust gas charge pump the enthalpy of the exhaust gas supplied thereto on the primary side is transmitted in whole or in part to a fresh gas flow supplied thereto on the secondary side, or the enthalpy of the exhaust gas, converted into expansion work in the exhaust gas charge pump on the primary side, is converted in whole or in part into compression work in a supplied fresh gas flow on the secondary side. Advantageously, in the exhaust gas charge pump the enthalpy withdrawal from the exhaust gas is converted into compression work in a cold gas flow hermetically separated from the exhaust gas flow. A compressed fresh gas flow has high energy density for small moving masses, and this underlines the suitability thereof for high working frequencies of the exhaust gas charge pump (=high engine speeds).

In an advantageous configuration, the cold gas flow and/or fresh gas flow, which has been compressed in the exhaust gas charge pump by the compression work per-formed therein, may be supplied, in a design independent of the fresh gas air flow of the heat engine or the combustion engine, to a separate expansion machine, such as a vane expander, and be decompressed therein to provide power. By way of the fresh gas or cold gas airflow compressed in the exhaust gas charge pump, it is made possible in this variant to provide a working medium independent of the engine, which can be used flexibly otherwise than as a working medium. For example, it is conceivable to use this working medium to drive an additional unit, or the expansion machine may also be coupled to the engine shaft or crankshaft of the combustion engine or the heat engine, in such a way that a usable additional power of the combustion engine is generated directly.

However, a particularly advantageous configuration provides that the enthalpy withdrawal from the exhaust gas in the exhaust gas charge pump is used for performing compression work for the fresh gas flow flowing to the combustion chamber of the respective cylinder. As a result, the exhaust gas enthalpy is used directly to charge the fresh gas flow. So as to implement this particularly favourably, in a manner synchronised with and adapted to the cycle sequence in the combustion engine, the fresh gas provided for supplying to the combustion chamber of the combustion engine is advantageously supplied at least in part to the secondary side of the exhaust gas charge pump, where it is compressed and pressurised in the stated manner during the first sub-phase of the outlet cycle by the exhaust gas supplied to the exhaust gas charge pump on the primary side. This compressed and pressurised fresh gas is subsequently advantageously supplied to a buffer, positioned downstream from the secondary side of the exhaust gas charge pump on the gas side, where it is reserved for supplying to the combustion chamber of the cylinder. An inlet duct system of the cylinder in question, which is already present in any case and via which the fresh gas is supplied to the combustion chamber in question, may be used for the buffering. The fresh gas pre-compressed and pressurised in the exhaust gas charge pump is preferably buffered until the inlet control system of the cylinder in question opens the respective inlet duct and the fresh gas can flow into the combustion chamber. This configuration, in which the fresh gas flow pressurised in the exhaust gas charge pump is used for supplying the heat engine with combustion air in whole or in part, provides that the fresh gas pressurised in the exhaust gas charge pump can provide piston work or expansion work directly to the heat engine by way of a positive scavenging gradient.

As regards the combustion engine, the stated object is achieved in that the combustion chamber of the or each cylinder is in each case connected to a gas inlet system via an actuable inlet valve system on the inlet side and both to an exhaust system and to the primary side of an exhaust gas charge pump via an actuable outlet valve system via a pulse switch on the outlet side.

This configuration of the exhaust gas system provides that, by means of the pulse switch, which preferably basically forms a suitable selected pipeline branch in terms of functionality, during the first phase of the outlet cycle the pulse of the exhaust gas pressure wave can be selectively introduced to the exhaust gas charge pump. The purpose of the pulse switch is to pass the pulse of the exhaust gas flow as completely as possible into the primary side of the exhaust gas charge pump or into a branch line upstream therefrom when the outlet valve is opened, in such a way that in this first cycle phase of the outlet cycle the pulse of the exhaust gas pressure wave flowing out of the cylinder is transmitted as completely as possible or at least in part to the primary side of the exhaust gas charge pump. In this phase, an escape of exhaust gas into the exhaust gas duct, which would mean a loss of pulse, should be largely prevented. The desired pulse transmission from the exhaust gas pressure wave to the primary side of the exhaust gas charge pump may take place in that the exhaust gas arrives directly in the exhaust gas charge pump at least in part; however, indirect pulse transmission is particularly preferred, in which the exhaust gas pressure wave flowing out of the cylinder transmits the pulse thereof in part or as completely as possible to a gas cushion located in and/or upstream from the primary side of the exhaust gas charge pump or in a branch line upstream therefrom.

In a particularly advantageous configuration, the pulse switch comprises a primary duct, which is connected to the outlet valve system on the inlet side and to the primary side of the exhaust gas charge pump on the outlet side, and an exhaust gas duct, branching off from said primary duct and connected to the exhaust system on the outlet side. The branch line which comprises the output-side part of the primary duct and which connects the pulse switch to the primary side of the exhaust gas charge pump preferably has a volume or more than 1 times, preferably more than 1.3 times, the cylinder capacity of the cylinder or cylinders.

In a particularly advantageous configuration, the combustion engine is configured for use of the exhaust gas enthalpy contained in the exhaust gas supplied in the exhaust gas charge pump to perform compression work for a fresh gas airflow. For this purpose, the exhaust gas charge pump is advantageously connected to a fresh gas pressure line and to a fresh gas suction duct on the secondary side, it being possible to fill the secondary side of the exhaust gas charge pump with fresh gas through the fresh gas suction duct, and the fresh gas pressure line being provided and configured for passing on and/or buffering the fresh gas compressed in the exhaust gas charge pump. In a first advantageous development, the fresh gas pressure line is connected on the downstream side of the exhaust gas charge pump to an expansion machine. In a second advantageous development, the fresh gas line is connected on the downstream side of the exhaust gas charge pump to a buffer for the fresh gas, which is in turn connected on the output side to the gas inlet system of the cylinder in question. It is thus made possible to exploit the fresh gas compressed or pressurised in the exhaust gas charge pump as combustion air for the cylinder in question, in such a way that the enthalpy drawn from the exhaust gas in the exhaust gas charge pump can be used directly by way of a positive scavenging gradient for the exploitation of piston work or expansion work directly at the combustion engine.

In a particularly preferred configuration, the exhaust gas system of the combustion engine is configured, by way of the pulse switch and the components connected thereto, for the aforementioned flow conduction of the exhaust gas pressure wave, without active external control or regulation interventions being required for this purpose. However, in an alternative advantageous variant, considered independently inventive per se, the exhaust gas system may also be provided in the manner of a positive control system having actively actuated valves in the exhaust gas tract, in which valves the outlet cycle is subdivided into a first and a second cycle phase, not by way of the flow behaviour of the exhaust gas pressure wave, but by way of corresponding, suitable actuation of the exhaust gas valve or valves.

This alternative configuration of the exhaust gas system provides that the provided multi-phase configuration of the outlet cycle can be achieved by suitably actuating the outlet valve system. For this purpose, the outlet valve system should advantageously be configured in such a way that, during the outlet cycle, the flow paths and thus the mode of operation of the exhaust gas conduction can be changed over, the exhaust gas flow preferably being conducted exclusively to the primary side of the exhaust gas charge pump in a valve position assigned to the first cycle phase of the outlet cycle. By contrast, in a valve position of the outlet valve system assigned to the second cycle phase of the outlet cycle, the combustion chamber of the engine cylinder is connected to the primary side of the exhaust gas charge pump and to the exhaust gas system simultaneously in the manner of a gas-side short circuit.

This functionality, provided in a particularly advantageous configuration, of the outlet valve system can be achieved by way of suitably selected and positioned valves in the exhaust gas tract of the combustion engine. A configuration of this type is for example particularly suitable for 4-stroke engines, since suitably actuated outlet valves are already provided for these in any case for opening the exhaust gas duct. By contrast, for 2-stroke engines, the provided functionality of the outlet valve system may be achieved by way of a suitable slot control system, in other words by way of suitable guided outlet slots and overflow ducts in the cylinder. In this context, a first outlet slot, which is passed over by the piston first in the working movement thereof and via which the exhaust gas can flow to the primary side of the exhaust gas charge pump, is advantageously provided in the cylinder wall. In addition, in this context a second outlet slot downstream in terms of the piston movement is advantageously provided, and establishes the gas-side connection between the combustion chamber of the cylinder and the exhaust system. When the piston has also opened this outlet slot, the primary side of the exhaust gas charge pump is also connected to the exhaust system on the gas side directly via the combustion chamber of the cylinder. In this configuration of a 2-stroke engine, the piston-cylinder unit thus performs the stated function of the outlet valve system by making use of the correspondingly positioned outlet slots. In this embodiment, the compressed fresh air from the exhaust gas charge pump is supplied via the fresh gas pressure duct to the overflow ducts, which when opened blow the fresh gas into the cylinder and scavenge the residual gas. The exhaust gas charge pump can thus replace the generally conventional crankcase charge pump and make a crank drive with circulatory oil lubrication possible.

Advantageously, in the case of positively controlled exhaust gas conduction of this type, the outlet valve system is configured in terms of the major operating parameters thereof in such a way that in the first cycle phase of the outlet cycle it exclusively opens a gas-side connection between the combustion chamber of the cylinder in question and the primary side of the exhaust gas charge pump, whilst the connection to the exhaust system is blocked, and in the second cycle phase of the outlet cycle it establishes the gas-side connection of the exhaust system both to the combustion chamber of the cylinder in question and to the primary side of the exhaust gas charge pump. A particular advantage of a system of this type is that further operating parameters such as the valve timings of the blow-down timing and the overflow ducts can be kept close to known configurations, since in the exhaust gas charge pump a similar energy exchange between exhaust gas and fresh gas takes place to in the resonance exhaust system conventional for two-stroke engines. Thus, the compatibility with existing systems, including with regard to possible retrofittings, is also particularly good. Among others, two major advantages of the exhaust gas charge pump over a resonance exhaust system are the lower space requirement and the independence of the mode of operation thereof from the rotational speed, meaning that a more uniform torque progression of the engine can be expected.

In a further alternative embodiment of a combustion engine, the exhaust gas charge pump is arranged on a rotary slide control system in a cylinder head. If the control slot of the rotary slide, preferably configured as a planar rotary slide, begins to open the outlet in the cylinder head of the combustion engine, exhaust gas flows to the exhaust gas charge pump via the blow-down duct. As the rotary slide continues to rotate, the primary outlet duct begins to open, via which the exhaust gas now escapes from the exhaust gas charge pump and the combustion chamber of the cylinder.

In particular in connection with a rotary slide control system, the exhaust gas charge pump can implement all of the load change variants described in the above-described methods. In particular, using rotary slide control systems, very small harmful volumes between the engine outlet rotary slide and the exhaust gas pump can be implemented.

Advantageously, in the case of a positively controlled configuration of the exhaust gas system, the exhaust system of the combustion engine is connected to the combustion chamber of the cylinder in question via an exhaust gas line which can be blocked using a blocking valve and from which a branch line, connected to the exhaust gas charge pump on the primary side, branches off upstream from the blocking valve in terms of the direction of the exhaust gas flow. This makes it possible to implement the stated functionality in a constructionally particularly simple manner. In particular, via the branch line, in the first cycle phase of the outlet cycle the exhaust gas from the combustion chamber can be supplied to the primary side of the exhaust gas charge pump, whilst in the second cycle phase the exhaust gas, located in the primary side of the exhaust gas charge pump and now decompressed, can be fed back to the exhaust system or to the combustion chamber again via the branch line in the manner of a return flow through the branch line. This means that a flow through the primary side of the exhaust gas charge pump is not necessary and is preferably also actually not provided. The branch line thus makes it possible to load the exhaust gas charge pump in the form of a displacement mass flow, which causes a smaller thermal component loading of the exhaust gas charge pump, since by comparison with a flow through the exhaust gas charge pump both the total mass flow and the heat transfer coefficients (lower gas speeds) turn out lower. The branch line to the exhaust gas charge pump may thus be connected directly to the first outlet slot in the cylinder on the gas side in the stated manner in the configuration of the combustion engine as a 2-stroke engine.

The exhaust gas charge pump, which is provided for use in a combustion engine configured in accordance with one of the stated variants, is also considered an independent inventive achievement in terms of the configuration thereof. According to the invention, the exhaust gas charge pump comprises a pressure housing, the internal volume of which is subdivided by a number of resiliently deformable separating units into a plurality of sub-volumes separated from one another on the gas side, the or each separating unit being subjected to a biasing force in such a way that in the pressure-free state the sub-volume provided for connection to the exhaust gas system of the combustion engine has a minimum value in terms of the resilient deformability of the or each separating unit.

As a result of this configuration, it is provided by particularly simple means and in a particularly reliable manner that the exhaust gas enthalpy can be used reliably for compression work for the supplied fresh gas air flow. As a result of the subdivision of the pressure housing into preferably two sub-volumes, it is provided that the expansion of the primary-side sub-volume, into which the exhaust gas under pressure is guided, leads directly and virtually without losses to a corresponding compression of the second sub-volume, since as a result of the shared pressure housing the total of the sub-volumes cannot change. The expansion of the exhaust gas in the first sub-volume thus leads directly and completely to a corresponding compression of the fresh gas located in the second sub-volume. Subjecting the separating unit to a biasing force ensures that in the pressure-free state the first sub-volume, provided for receiving the exhaust gas, can be kept to a minimum, ideally virtually at zero, in such a way that dead volumes can be kept particularly low at least in the exhaust gas charge pump.

The separating unit of the exhaust gas charge pump may in principle be configured in different variants whilst adhering to the stated constraints. For example, the separating unit could be configured as a bellows or as a piston guided in the pressure housing, it being possible in each case for a spring element to be provided for biasing and restoring. Among these variants, the configuration as a bellows has the advantage over the piston that leaks and gas-side overflowing between the sub-volumes can be reliably prevented. However, with a view to a particularly simple and robust configuration, a particularly advantageous configuration provides that the exhaust gas charge pump is configured as a membrane pump. In this case, the separating unit forms the membrane of the membrane pump.

The advantages achieved by the invention are in particular that, because the supply of the exhaust gas flowing out of the cylinder to the exhaust gas pump as a primary medium or drive medium is limited to the first sub-phase of the outlet cycle, and because of the subsequently provided diversion of the remaining exhaust gas and of the exhaust gas, which is decompressed at least in part on the primary side of the exhaust gas charge pump, to the exhaust system, extensive and reliable exploitation of the pressure gradient of the exhaust gas enthalpy for increasing the efficiency or power of the combustion engine is made possible. The rapid decompression at the start of the second cycle phase makes low gas exchange losses possible, similarly to a suction engine. This is possible with a low complexity of equipment and with high reliability.

Further, a combustion engine configured in accordance with the stated design has the following advantageous properties:

Discontinuous exhaust gas enthalpy flows, such as occur for example in single-cylinder engines, can reliably be converted into compression work in a cold gas flow.
The design is also suitable in particular for small engines (for example having cylinder volumes 250 cc) and corresponding low exhaust gas flows.
Very good dynamic behaviour can be achieved, in particular including in partial load ranges (for example for vehicle engines).
The delivery rate of the cold gas flow is approximately proportional to the engine speed.
Hermetic separation of exhaust gas and fresh gas is possible.
Only a comparatively low exhaust gas counter pressure is brought about.
Only a low internal power loss is brought about.
The system costs are comparatively low because of the simple construction and the control system which can be configured passively per se.
Connection to existing engine designs is possible.
Good acoustic properties can be achieved.
The design is applicable to both petrol and diesel engines and also to internal combustion engines operating in four-cycle or two-cycle operating methods.

A combustion engine equipped in this manner may in particular be configured as a low-cylinder-capacity single-cylinder combustion engine, in which high efficiency can be achieved. Engines of this type, which are generally configured as free-suction four-stroke petrol engines, are produced worldwide on a large scale, for example for two-wheelers (50-250 cc cylinder capacity), industrial engines (including diesel engines) for power generators, pumps, etc. and (mini) block heating stations. In passenger vehicle engines, too, the exhaust gas pump may also be used as the sole charging unit or act as a two-stage compressor in series with a turbocharger. In this case, the exhaust gas charge pump advantageously forms the first stage, from which a turbocharger is positioned downstream both on the turbine side and on the compressor side.

The advantages achieved by the invention further include the fact that, as a result of the targeted exploitation of the enthalpy contained in the exhaust gas pressure wave, in particular as a result of targeted transmission of the pulse of the exhaust gas pressure wave to the primary side of an exhaust gas charge pump by means of the pulse switch, an additional compression of the fresh gas flow is achieved and exploitation of the pulse to increase the efficiency and/or power is made possible. In particular, it is possible to convert the kinetic energy contained in discontinuous pressure pulses of gases directly or indirectly into mechanically usable energy using an exhaust gas charge pump so as to increase efficiency. In particular, in this way pulsed exhaust gas flows, such as occur for example in outlet systems of combustion engines, or steam flows, originating from steam processes or steam generator units or occurring in heat engines in general, can be exploited.

Figure 4:
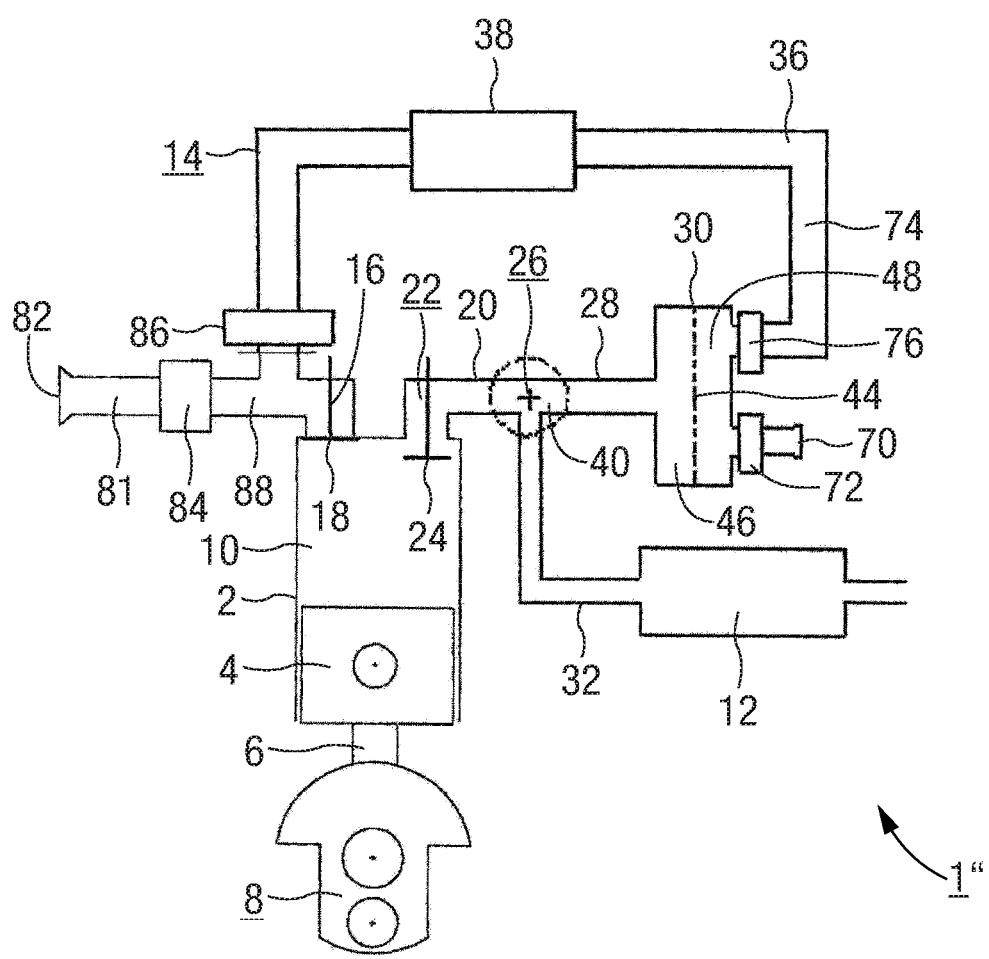
Figure 5:
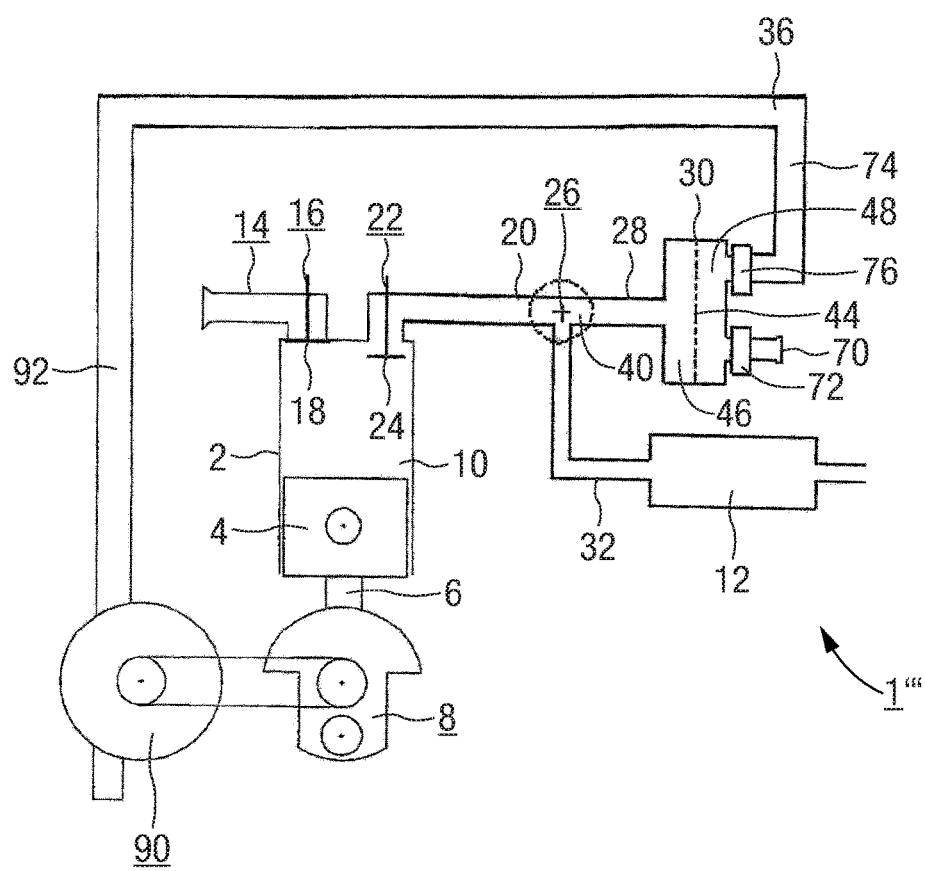
Figure 6:
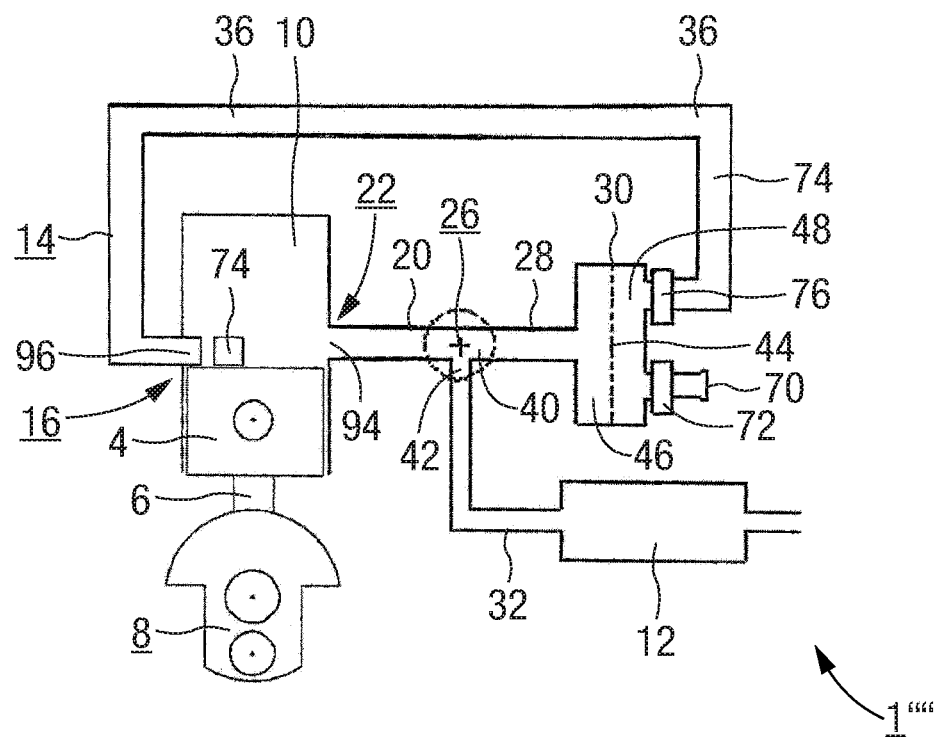
Figure 7:
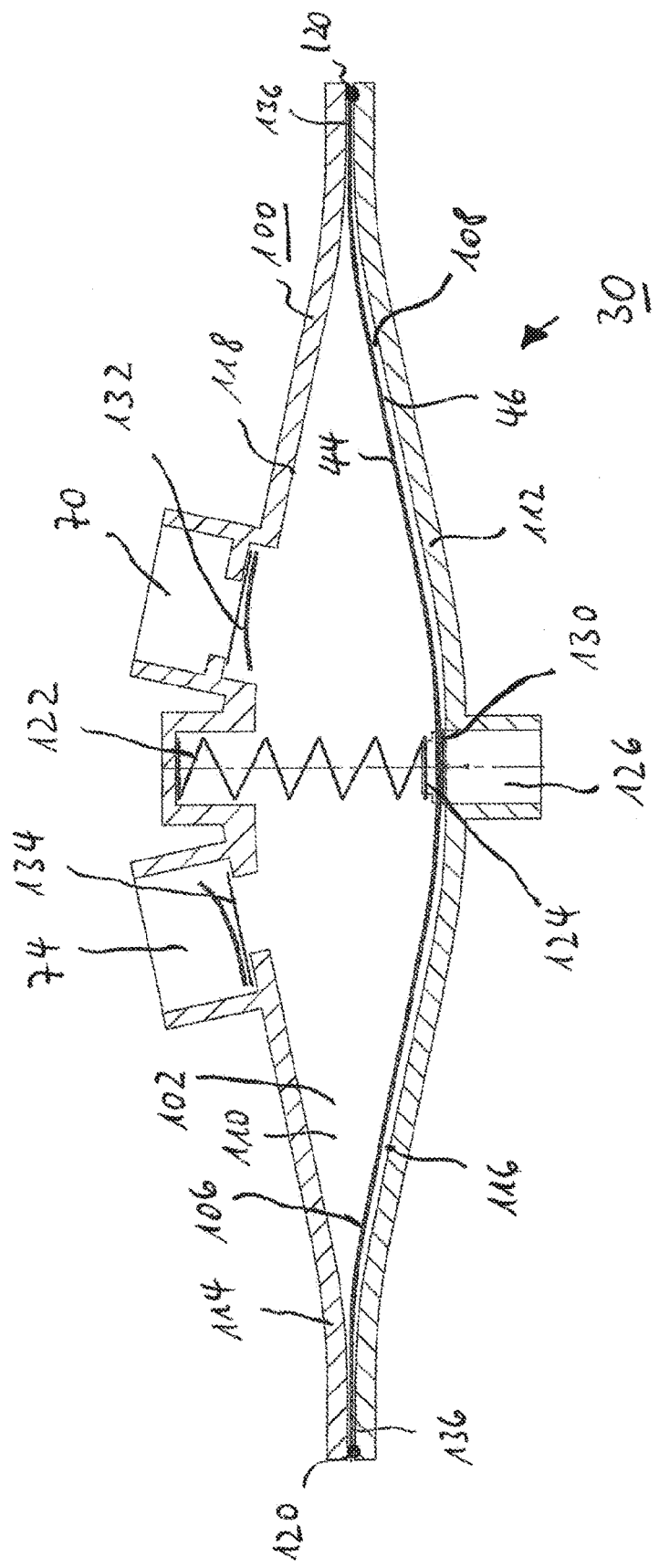
Figure 8:
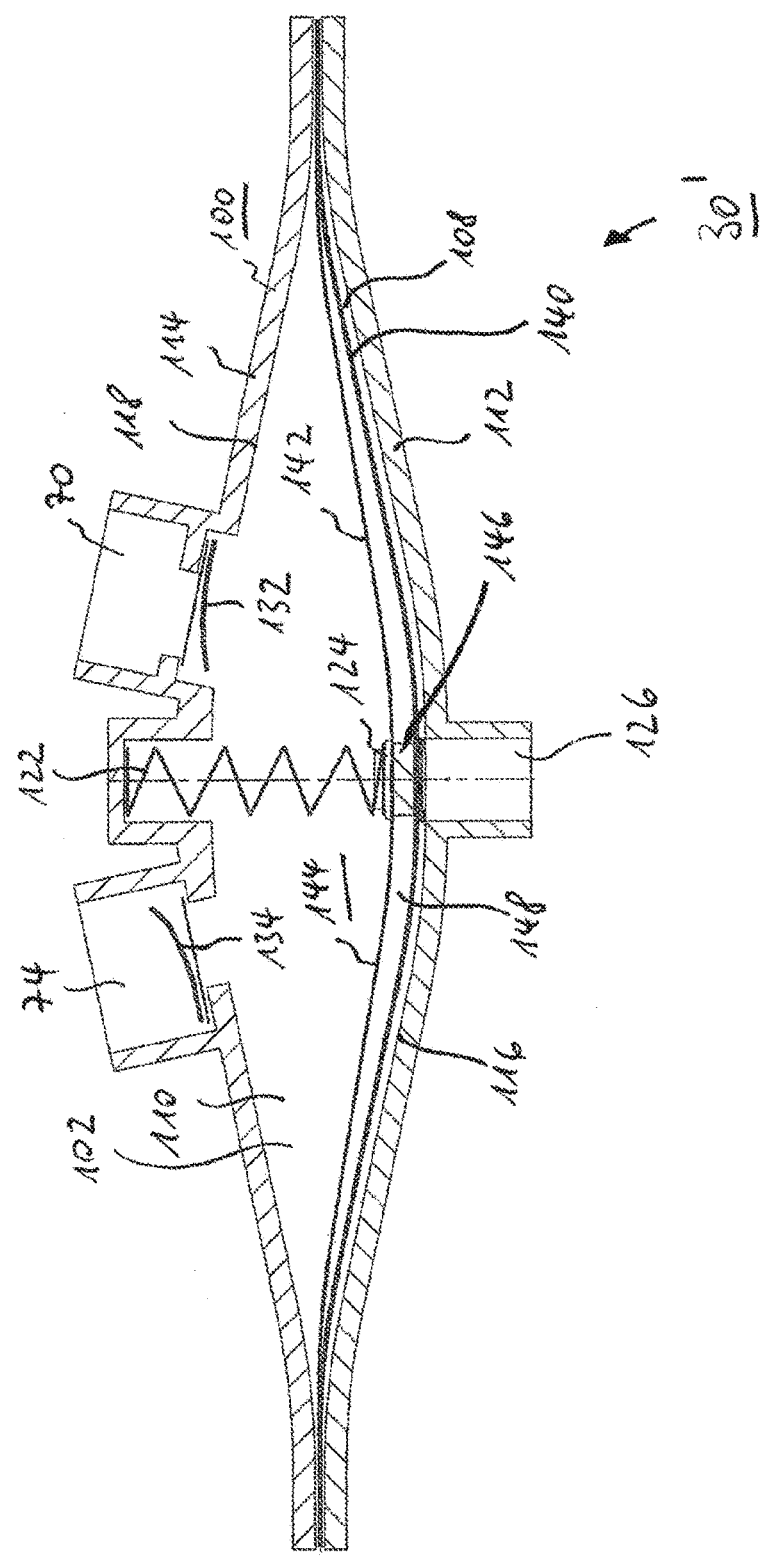
Figure 9:
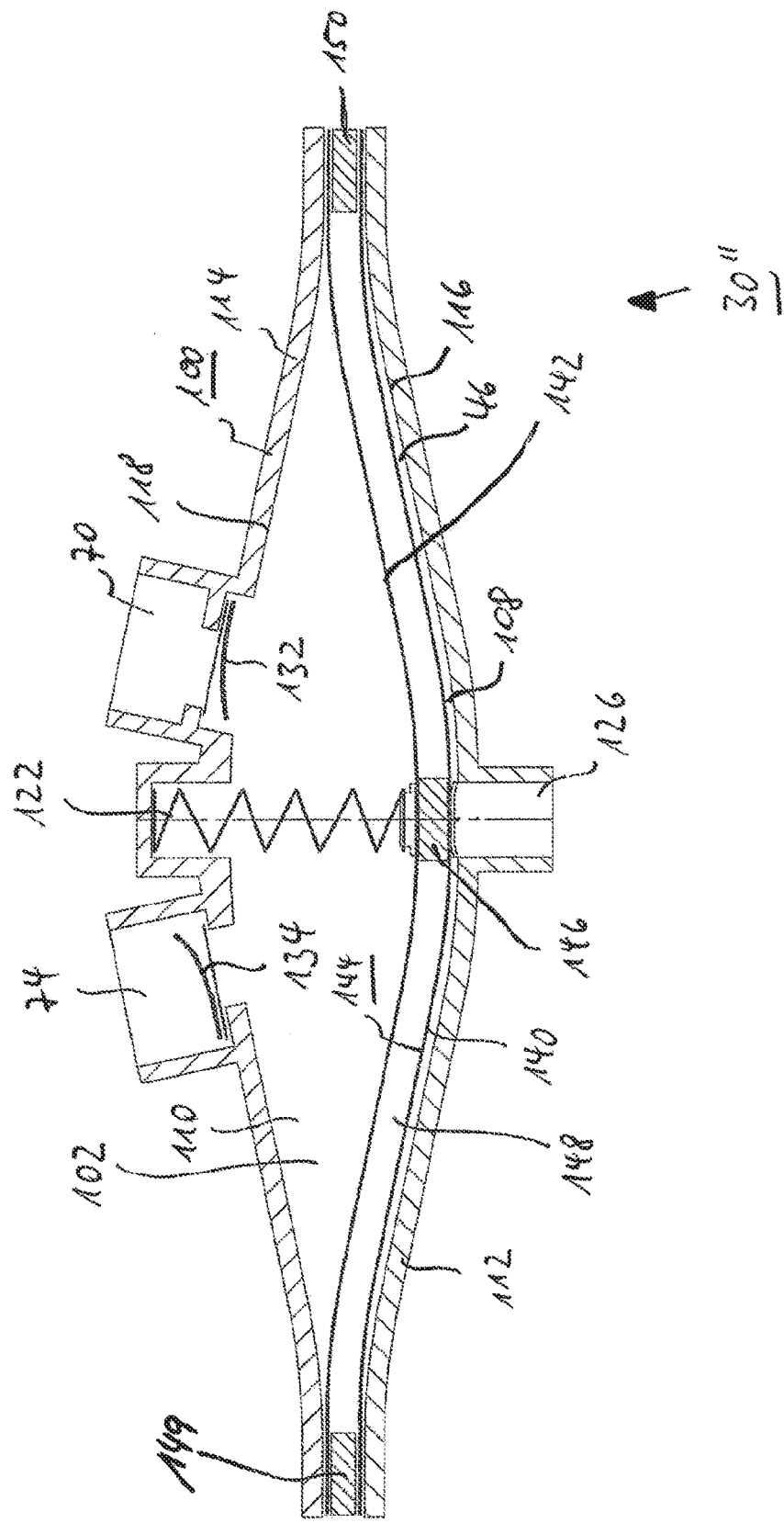
Figure 10:
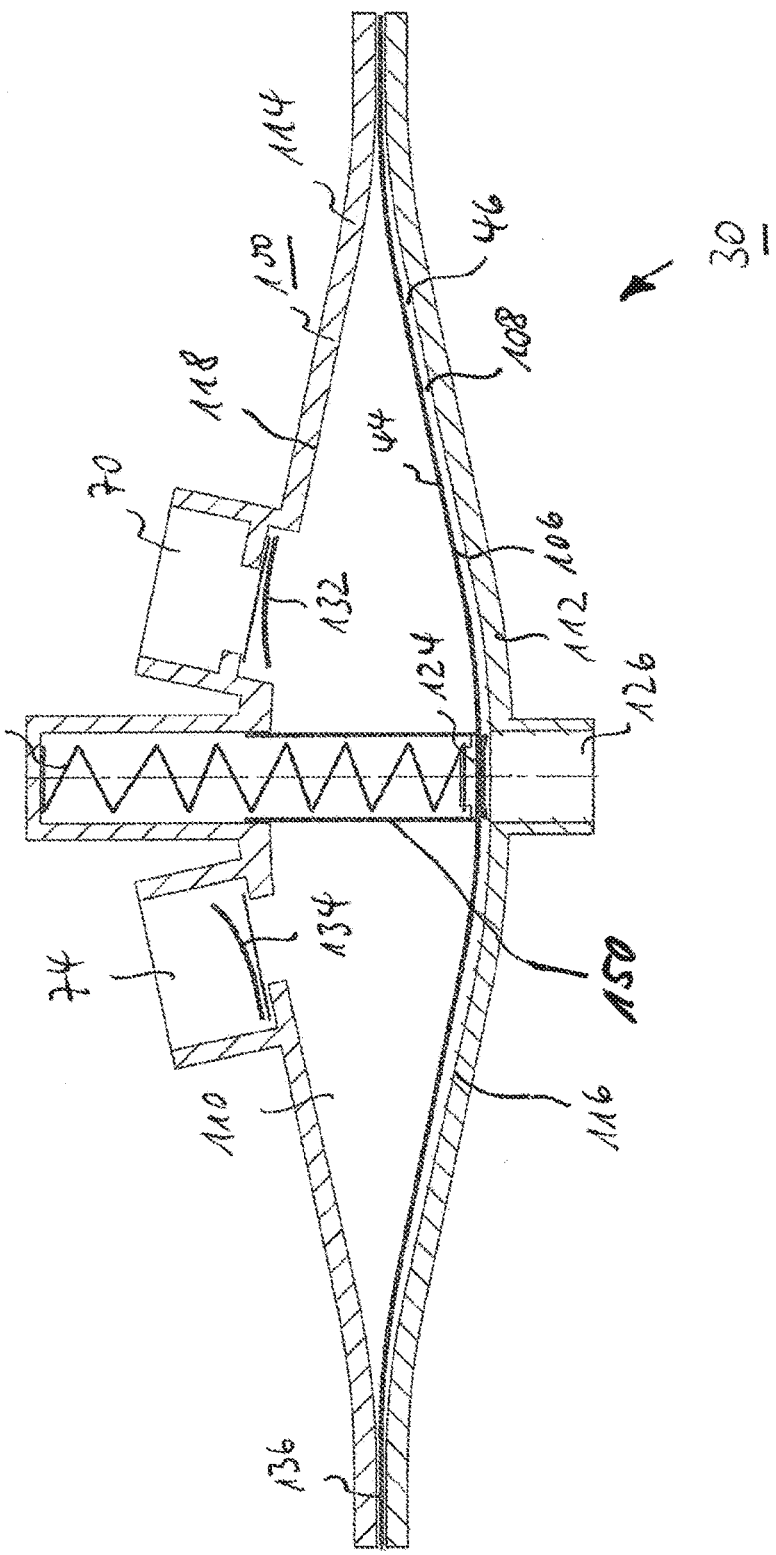

An embodiment of the invention is described in greater detail with reference to drawings, in which:

FIG. 1 schematically shows a combustion engine,
FIGS. 2a-2e are each a longitudinal section of a pulse switch for the combustion engine of FIG. 1,
FIGS. 3-5 each schematically show an alternative embodiment of a combustion engine,
FIG. 6 schematically shows a two-stroke combustion engine,
FIG. 7 is a cross section of an exhaust gas charge pump,
FIGS. 8-10 are each a cross section of an alternative configuration of an exhaust gas charge pump, and
FIGS. 11-19 are each a detail from the cross-sectional drawing of FIG. 6, showing different alternatives.

Like parts are provided with like reference numerals throughout the drawings.

The combustion engine 1 shown schematically in FIG. 1 is configured for the 4-cycle method. It comprises a number of cylinders 2, only one of which is shown in FIG. 1 and in each of which a working piston 4 is guided. The working piston 4 acts on a crankshaft 8 via a piston rod 6. Depending on the configuration and construction of the combustion engine 1, the working piston or pistons 4 of a plurality or all of the cylinders 2 may also act on a shared crankshaft 8.

In the conventional manner, the combustion chamber 10, in which a compressed fuel-air mixture is ignited in the working cycle of the cylinder 2, is located within the cylinder 2. As a reaction to this, the working piston 4 arranged displaceably in the cylinder 2 performs a working stroke, driving the crankshaft 8 to provide power. After the working stroke is complete, in other words after the expansion of the combusted working gas in the cylinder 2 and shortly before bottom dead centre (BDC) is reached, the combusted working gas is supplied to an exhaust system 12, connected to the cylinder 2 on the outlet side, as exhaust gas during an outlet cycle of said cylinder.

For the gas exchange required for operating the cylinder 2, the combustion chamber 10 is connected on the gas inlet side to a gas inlet system 14 and on the outlet side to the exhaust system 12. To control the gas exchange in the combustion chamber 10, on the one hand the combustion chamber 10 can be blocked off from the gas inlet system 14 by means of an inlet valve system 16, which is configured as an inlet valve 18 in the embodiment of FIG. 1. On the other hand, the combustion chamber 10 can be blocked off from the exhaust gas tract 20 leading to the exhaust system 12 by means of an outlet valve system 22, which is configured as an outlet valve 24 in the embodiment of FIG. 1.

The combustion engine 1 is selectively configured for a particularly high specific power yield and/or a particularly high efficiency and thus low specific fuel consumption. For this purpose, it is provided that at least part of the exhaust gas enthalpy, which is otherwise not actually exploited, is drawn from the hot exhaust gas flowing out of the combustion chamber 10 during the outlet cycle of the cylinder 2 in question, so as to convert it into mechanical drive energy and/or an increase in the fresh gas air density for supercharging, so as to increase the efficiency. This is to be achieved in that a pulse and/or energy is drawn as extensively as possible from the exhaust gas pressure wave flowing out of the combustion chamber 10 during the outlet cycle and transmitted to the fresh gas flowing to the combustion chamber 10 for pressurisation.

To make this possible, the exhaust gas tract 20 is made branched. For this purpose, a pulse switch 26 is connected into the exhaust gas tract 20, and is connected on the inlet side to the outlet valve system 22 and on the outlet side both to the primary side of an exhaust gas charge pump 30 via a branch line 28 and to an exhaust gas line 32 leading to the exhaust system 12. The combustion chamber 10 is thus connected both to the exhaust system 12 and to the primary side of the exhaust gas charge pump 30 on the outlet side via the outlet valve system 22 and via the pulse switch 26.

As a result of this setup, in the embodiment of FIG. 1 the enthalpy drawn from the exhaust gas in the exhaust gas charge pump 30 is exploited for compression and thus pressurisation of a cold gas flow supplied to the exhaust gas charge pump 30 on the secondary side, specifically in this embodiment to the fresh gas airflow provided for supply to the combustion chamber 10. Accordingly, in the embodiment of FIG. 1, the exhaust gas charge pump 30 is connected on the secondary side to a fresh gas line 36, which passes through a charge air cooler 38 and is on the outlet side is connected to the combustion chamber 10 of the cylinder 2 in a blockable manner via the inlet valve system 16.

In the embodiment of FIG. 1, the cylinder 2 of the combustion engine 1 is shown at the moment when the working piston 4 is located at bottom dead centre (BDC) and the outlet cycle of the cylinder 2 is beginning. The outlet valve 24 has begun to open. When the outlet valve 24 opens, the exhaust gas which is still under residual pressure escapes from the combustion chamber 10 of the cylinder 2 into the outlet duct or exhaust gas tract 20. Since the residual pressure of the exhaust gas in the cylinder 2 is generally between 2 and 8 bar, and there are average exhaust gas counter pressures of approximately 1.1-1.6 bar in the outlet duct, the exhaust gas flows past the outlet valve 24 at the speed of sound as a result of the supercritical pressure ratio. Because of the high exhaust gas temperatures, which are between 350 and 1150° C. in practice, the speed of sound for the exhaust gas reaches values of up to 1000 m/s. The pulse ($p=m \cdot v$) of the exhaust gas pressure wave, which is to be exploited in a targeted manner to increase efficiency and/or power in the present system, is correspondingly high.

Depending on the engine speed and the configuration of the engine valve drive, the transit time of the high-energy primary exhaust gas pressure wave is approximately 10-50 crankshaft degrees. The exhaust gas pressure wave flows through the pulse switch 26, which advantageously forms a pipe branching point. The pulse switch 26 has a primary duct 40, which is connected on the inlet side to the outlet valve system 22 and on the outlet side to the primary side of the exhaust gas charge pump 30, and from which an exhaust gas duct 42 branches off, which opens on the outlet side into the exhaust gas line 32 and is connected via this to the exhaust system 12. The primary duct 40 thus opens into the branch line 28 leading to the exhaust gas charge pump 30, whilst the exhaust gas duct 42 leads to the exhaust system 12 via which exhaust gas reaches the open air.

The pulse switch 26 has the purpose of guiding the pulse of the exhaust gas flow into the branch line 28 as completely as possible when the outlet valve 24 is opened, in such a way that in a first cycle phase of the outlet cycle the pulse of the exhaust gas pressure wave flowing out of the cylinder 2 is transmitted as completely as possible or at least in part to the primary side of the exhaust gas charge pump 30. In this phase, a flow of exhaust gas out into the exhaust gas duct 42, resulting in a loss of pulse, should be largely prevented. The desired pulse transmission from the exhaust gas pressure wave to the primary side of the exhaust gas charge pump 30 may be provided in that the exhaust gas arrives directly in the exhaust gas charge pump 30 at least in part; however, indirect pulse transmission is particularly preferred, in which the exhaust gas pressure wave flowing out of the cylinder 2 transmits the pulse thereof in part or as completely as possible to the gas column already located in the branch line 28, which in turn transmits it into the exhaust gas charge pump 30.

In the exhaust gas charge pump 30, the (directly or indirectly introduced) pulse of the exhaust gas flow arrives at the resilient intermediate wall 44 provided there between the primary and secondary side as a separating unit 44, and deforms it by pulse transmission. The moving mass of the resilient intermediate wall 44 is preferably comparable to the mass of the accelerated exhaust gas column, so as to transmit as much kinetic energy ($\tfrac{1}{2}m_{wall} \cdot v_{wall}^2$) as possible to the resilient intermediate wall 44 during the pulse transmission ($m_{gas} \cdot v_{gas} = m_{wall} \cdot v_{wall}$). The gas present in the primary side of the exhaust gas charge pump 30 thus expands in the increasing primary gas volume 46 of the exhaust gas charge pump 30. At the same time, on the opposite side of the resilient intermediate wall 44, fresh gas is compressed in the decreasing secondary or fresh gas volume 48, connected to the fresh gas line 36, in the exhaust gas charge pump 30. Thus, in the exhaust gas charge pump 30, enthalpy of the exhaust gas converted into expansion work on the primary side is converted into compression energy of the fresh gas guided in the fresh gas line 36 on the secondary side. For this purpose, the exhaust gas charge pump 30 must be configured suitably, for example as a bellows pump or the like. However, the configuration of the exhaust gas charge pump 30 as a membrane pump having a resilient intermediate wall 44 as a membrane should be considered particularly advantageous and independently inventive and is provided in the embodiment. In said pump, the exhaust gas is decompressed by deformation of the membrane which separates the two volumes of exhaust gas and fresh gas from one another in a gas-tight manner. In the pressure-free state, the volume on the exhaust gas side or primary side of the exhaust gas charge pump 30 is at a minimum, and the volume on the fresh gas side is accordingly at a maximum. The extremely low mass of the membrane makes possible a very rapid change of volume in the exhaust gas pump 30 and accordingly a rapid decompression of the exhaust gas within a few crankshaft degrees, in such a way that the first cycle phase of the outlet cycle, provided for converting the enthalpy of the exhaust gas, converted into expansion work on the primary side, into compression energy of the fresh gas guided on the secondary side in the fresh gas line 36, can be kept correspondingly short.

Subsequently, this is followed by the second cycle phase of the outlet cycle, in which the exhaust gas flows to the exhaust system 12. After the deformation of the resilient intermediate wall 44, it is moved back into the initial position thereof by a restoring force, and displaces the exhaust gas or the gas column located in the branch line 28 back to the pulse switch 26 via the branch line 28. From there, in the second cycle phase the exhaust gas arrives in the exhaust gas duct 42 whilst bypassing the exhaust gas charge pump 30, in other words without flowing through it. Likewise, the piston 4 displaces the exhaust gas still present in the cylinder 2 from said cylinder into the exhaust gas duct 42 via the exhaust gas tract 20 and the pulse switch 26. By contrast, during the compression the fresh gas is pushed out of the exhaust gas charge pump 30, by a check valve provided therein, into the fresh gas line 36 provided and configured as a pressure storage line, where it remains until the inlet valve 18 and an optionally provided additional valve 50 are opened. The fresh gas line 36 may thus be considered as a buffer, to which the fresh gas compressed in the exhaust gas charge pump 30 is supplied and in which it is reserved for supplying to the combustion chamber 10 of the cylinder 2.

The branch line 28 between the pulse switch 26 and the exhaust gas charge pump 30 is intended to draw as little pulse as possible from the exhaust gas pressure wave, for a particularly high pulse transmission to the primary side of the exhaust gas charge pump 30, resulting in low flow losses. Therefore, curves are preferably largely avoided in this line portion, or if present are formed with high radii of curvature (preferably r≤3 times pipe diameter). The flow cross section of the branch line 28 is advantageously selected at least as large as that of the outlet duct, or may even be up to 100% larger for low pressure losses. Before entering the exhaust gas charge pump 30, the branch line 28 may be constricted successively in regions, so as further to increase the gas speed and thus the pulse of the inflowing mass of gas.

The combustion engine 1 may be configured in such a way that the exhaust gas flowing out of the cylinder 2 in the first phase of the outlet cycle arrives directly in the primary gas volume 46 of the exhaust gas charge pump 30. Particularly advantageously, however, for thermal decoupling of the exhaust gas charge pump 30 from the components carrying hot gas, the system is configured for indirect pulse transmission, in which, in the first cycle phase of the outlet cycle, the pulse of the exhaust gas pressure wave flowing out of the cylinder 2 is transmitted in whole or in part to a gas cushion already located in the primary gas volume 46 of the exhaust gas charge pump 30, in such a way that this can subsequently be decompressed again to provide power. The branch line 28 and the exhaust gas or primary gas volume 46 of the exhaust gas charge pump 30 are thus not flowed through by the exhaust gas as such, but instead there is merely a displacement flow. The mass of gas which flows into this line portion downstream from the pulse switch 26 thus flows back again on the same path. In the branch line 28, after each pulse transmission to the exhaust gas charge pump 30, a more or less stationary gas column remains, the pressure of which is at the level of the exhaust gas counter pressure (1.1-1.6 bar) of the exhaust gas system, and the temperature of which is much lower than the exhaust gas temperature when the outlet valve 24 is opened as a result of continuous heat emission to the pipe wall surrounding it. If the exhaust gas pressure wave meets the gas column present in the branch line 28 when the outlet valve 24 is opened, the cooler mass of gas is initially displaced into the exhaust gas charge pump 30, and only subsequently and to a lesser extent does exhaust gas from the direct combustion cycle additionally flow.

Preferably, for this purpose, the volume of the branch line 28 is selected at least large enough that it corresponds to the expansion or primary gas volume 46 in the exhaust gas charge pump 30, taking into account the compression pressure in the exhaust gas charge pump 30. To set the desired volume, for a predetermined line cross section, the length of the branch line is advantageously suitably selected. As a result of the suitable volume selection, largely the same exhaust gas column is displaced back and forth repeatedly between the exhaust gas charge pump 30 and the branch line 28. This makes it possible largely thermally to decouple the exhaust gas charge pump 30 from the high temperature level of the engine exhaust gases and thus greatly to reduce the thermal load on the components. Further, the heat transmission in the exhaust gas charge pump 30 from the exhaust gas side to the fresh gas side can thus be greatly reduced. For example, assuming the same engine stroke volume and expansion volume in the exhaust gas charge pump 30 (and taking into account $p1/p2=(V2/V1)^{1.4}$), at a compression pressure in the exhaust gas charge pump 30 of 1.5 bar, a volume in the branch line 28 of at least 1 times, particularly preferably at least 1.35 times the stroke volume of the engine is particularly advantageous, in such a way that for a pre-existing gas cushion a pre-existing mass of gas is merely displaced from the branch line 28 into the primary gas volume 46 of the exhaust gas pump 30.

By contrast, at a compression pressure of 2 bar in the exhaust gas charge pump 30, a volume of 1.64 times the stroke volume of the engine would be particularly preferred for the branch line 28. Depending on the ratio of the engine stroke volume to the expansion volume and compression pressure of the exhaust gas charge pump 30, a minimum volume of the branch line 28 between one and two times the engine stroke volume should be considered particularly advantageous, so as, in so far as possible, not to allow any hot exhaust gas masses to enter the exhaust gas charge pump 30 directly during the compression shock.

However, this minimum volume of the branch line 28, which is advantageous for thermal insulation, reduces the kinetic exhaust gas energy ($Ekin=\frac{1}{2}mv^2$) as a result of pipe friction losses (decrease in speed) and in connection with this also the pulse ($I=mv$) of the pressure wave, in such a way that the volume or length of the branch line 28, for reasons of flow mechanics, should preferably not be made larger than the size necessary for thermal decoupling of the exhaust gas charge pump 30. However, under some circumstances it may be expedient to increase the mass of gas in the branch line 28 by way of a further volume or length expansion of this line, so as to bring the values of the masses of the accelerated gas column and the moving dividing wall closer together. In an additional advantageous configuration, the branch line 28 may be made directly or indirectly coolable, so as further to reduce the temperature of the remaining gas column. The cooling may be brought about by air cooling or liquid cooling, in the form of heat emission by radiation, convection cooling or force flow circulation.

A particular advantage of thermally decoupling the exhaust gas charge pump 30 is that it may be made in part or even completely of plastics materials, in such a way that high flexibility can be provided whilst the cost of manufacture can be kept very low. Thermoplastics, which can be produced cost-effectively by injection moulding, have a low weight and have good acoustic properties, are particularly preferably provided for the housing components. The resilient intermediate wall 44 is preferably also made of plastics material (thermoplastics, thermosets; rubber, etc.), reinforcement using tear-resistant fibre materials being advantageous. The fibres are advantageously laid bidirectionally at least once.

Since the exhaust gas pressure wave is reflected at least in part at the resilient intermediate wall 44 in the exhaust gas charge pump 30, the exhaust gas pressure wave transmits more than the simple pulse to the resilient intermediate wall 44.

In functional terms, the pulse switch 26 preferably forms a pipeline branching point, and has the particular advantage that it has no moving components and can thus be made particularly durable and low-maintenance. It is basically configured to transmit the exhaust gas pulse arriving at the inlet side to the branch line 28 and to the gas cushion optionally located therein with as little loss as possible or with low loss. As can be seen from the embodiments of FIGS. 2a-2e, for this purpose the pulse switch 26 may be formed as a pipe branching point in the manner or a T-piece, Y-piece or ejector pump, of which the primary duct 40 (characterised by the primary flow direction indicated by the arrow 60 for the exhaust gas pulse) connects the inflow region 62 for the exhaust gas, which is connected to the outlet valve system 22, to the branch line 28 to the exhaust gas charge pump 30 in as straight a line as possible (examples of FIG. 2a-2d) or in a slightly curved manner (example of FIG. 2e). The exhaust gas duct 42, through which the exhaust gas flows to the exhaust system 12 as indicated by the arrow 64 in the second cycle phase of the outlet cycle, branches off from the primary duct 40. The duct path is preferably configured in such a way that the pulse losses for the arriving exhaust gas pulse in the region of the pulse switch 26 are kept particularly low.

The exhaust gas pressure wave, which passes from the outlet duct of the engine into the pulse switch 26, should particularly preferably be passed through the pulse switch 26 to the exhaust gas charge pump 30 with as little energy loss as possible. According to the Bernoulli equation ($p+\frac{1}{2}\rho v^2$=const.), this means that the stagnation pressure in the primary duct 40 in the pulse switch 26 in the direction of the exhaust gas duct 42 should preferably be equal to the static pressure in the exhaust gas duct 42. This configuration goal is preferably approximately achieved by way of a straight flow passage in the primary duct 40 without jumps in the flow cross section. The exhaust gas duct 42 to the exhaust system 12 is preferably attached to the pulse switch 26 laterally. As well as the perpendicular opening of the exhaust gas duct 42 into the pulse switch 26, as shown in FIG. 2b, oblique arrangements (rearwardly inclined as in FIG. 2a or forwardly inclined as in FIG. 2c) are also possible. By contrast, 2d shows the arrangement of the exhaust gas duct 42 around the primary duct 40 in the form of an annular duct 66. This construction is similar to that of an ejector pump.

FIG. 2e shows an embodiment of the pulse switch 26 with a curved primary duct 40. In this arrangement, in an advantageous configuration, the exhaust gas duct 42 opens on the inside of the curvature of the primary duct 40, since the gas speed is lowest in this region of the pipe wall and the pulse direction of the exhaust gas pressure wave points largely tangentially to the pipe opening of the exhaust gas duct 42. In principle, for flow guidance in the pulse switch 26, additional guide plates or screens may be attached, so as to reduce direct flow of the pulse of the exhaust gas pressure wave into the exhaust gas duct 42 or so as to promote equilibrium between the stagnation pressure and the static pressure at the exhaust gas duct 42.

To keep the line losses of the exhaust gas pressure wave as low as possible, the pulse switch 26 is advantageously positioned as close as possible to the outlet duct of the engine or of the outlet valve 24. Particularly preferably, the pulse switch 26 is positioned directly at the outlet duct of the cylinder head of the combustion engine, in particular as a first component of an exhaust gas system, or even placed directly in the cylinder head in the manner of an integrated configuration.

In the embodiment, a configuration is shown in which an individual pulse switch 26 and accordingly an individual exhaust gas charge pump 30 are assigned to a single cylinder 2. Alternatively, however, a plurality of cylinders 2 or outlet ducts thereof may be connected to a shared pulse switch 26, and thus drive an exhaust gas charge pump 30 shared by the cylinders 2 at a correspondingly increased cycle frequency, the fresh gas line 36 being connected to the inlet valves 16 of one or more cylinders 2. It is also possible to have a plurality of cylinders 2, along with pulse switches 26 respectively assigned thereto, act on a shared exhaust gas charge pump 30, in that the respective branch lines 28 are combined shortly before entering the exhaust gas charge pump 30.

The fresh gas line 36, configured as a pressure storage line, has a considerable influence, by way of the storage volume thereof, on the pressure progression during the fresh gas inflow (suction phase) into the cylinder 2. In relation to the stroke volume of the cylinder 2, a large storage volume results in a smaller but approximately constant scavenging pressure with low piston work and a high charging level. Conversely, a small storage volume, accompanied by high pressurisation, tends towards increased piston work and a lower charging level. A storage volume of the fresh gas line 36 which is tuned to the load state of the engine or which is variable is advantageous for efficient exploitation of the exhaust gas energy, comparatively small storage volumes preferably being provided for partial load and comparatively large ones preferably being provided for full load. To make the storage volume of the fresh gas line 36 correspondingly variable or adjustable, in a preferred configuration, corresponding adjusting elements, for example in the manner of suitable fixtures, may be provided in or on the fresh gas line 36.

Instead of compressing a gas volume, the resilient intermediate wall 44 of the exhaust gas charge pump 30 may also drive direct power generators (rotating or linear), pumps or similar machines via mechanical coupling elements such as push rods, plungers, crank drives, etc.

In the embodiment of FIG. 1, the fresh gas line 36, to which the exhaust gas charge pump 30 is connected on the secondary side, comprises a fresh gas suction duct 70, which is provided with a valve 72, which exclusively makes it possible for fresh gas to flow into the secondary side of the exhaust gas charge pump 30 and prevents reverse flows. The valve 72 may accordingly be configured for example as a shutter valve. On the fresh gas side or secondary side of the exhaust gas pump 30, a fresh gas pressure duct 74, into which the fresh gas compressed by the membrane in the exhaust gas charge pump 30 is urged out of said pump, is provided as a further component of the fresh gas line 36. To prevent the compressed fresh gas from flowing back into the exhaust gas charge pump 30, the fresh gas pressure duct 74 is likewise provided with a valve 76, which exclusively makes a flow from the exhaust gas charge pump 30 into the fresh gas charge duct 74 possible but prevents a reverse flow. The valves 72, 76 may advantageously be configured as self-regulating check valves (reed valves).

To achieve a particularly high compression ratio on the fresh gas side or secondary side of the exhaust gas charge pump 30, in a particularly preferred configuration the valves 72, 76 are located as close as possible to the compression chamber of the exhaust gas charge pump 30, so as to keep the harmful volumes respectively located between the valves 72, 76 and the compression chamber of the membrane as small as possible.

In the embodiment, the fresh gas pressure duct 74 is provided with the charge air cooler 38, which cools the compressed fresh gas. Alternatively or in addition, the housing half of the exhaust gas charge pump 30 on the fresh gas side or the line path for the fresh gas pressure duct 74 itself is preferably configured as a heat exchanger (cooler).

Once the gas in the primary side of the exhaust gas charge pump 30 has been sufficiently decompressed and the exhaust gas flows out through the exhaust gas duct 42, the membrane of the exhaust gas pump 30 is moved into the rest position thereof by means of a return spring, the remaining gas being displaced out of the primary volume 46 of the exhaust gas charge pump 30 and fresh gas simultaneously being sucked in from the exhaust gas charge pump 30 via the fresh gas suction duct 70. The operation cycle of the exhaust gas charge pump 30 can now begin anew. For sufficiently sized flow cross sections of the valves 72, 76 and ducts, the delivery rate on the fresh gas side is approximately proportional to the operating frequency of the exhaust gas charge pump 30 or to the engine speed. In principle, one exhaust gas charge pump 30 may also be driven using a plurality of engine cylinders, assuming that there are no overlaps in the scavenging phases in the exhaust gas charge pump in view of the firing sequence of the engine cylinders.

In the embodiment of FIG. 1, because of the mode of operation of the pulse switch 26, the outlet cycle of the combustion engine 1 is automatically divided into the two cycle phases provided. However, in an alternative variant, which should be considered independently inventive, the outlet cycle may be subdivided into the two cycle phases in the manner of positive control. An embodiment for this variant is shown in FIG. 3.

Figure 3:
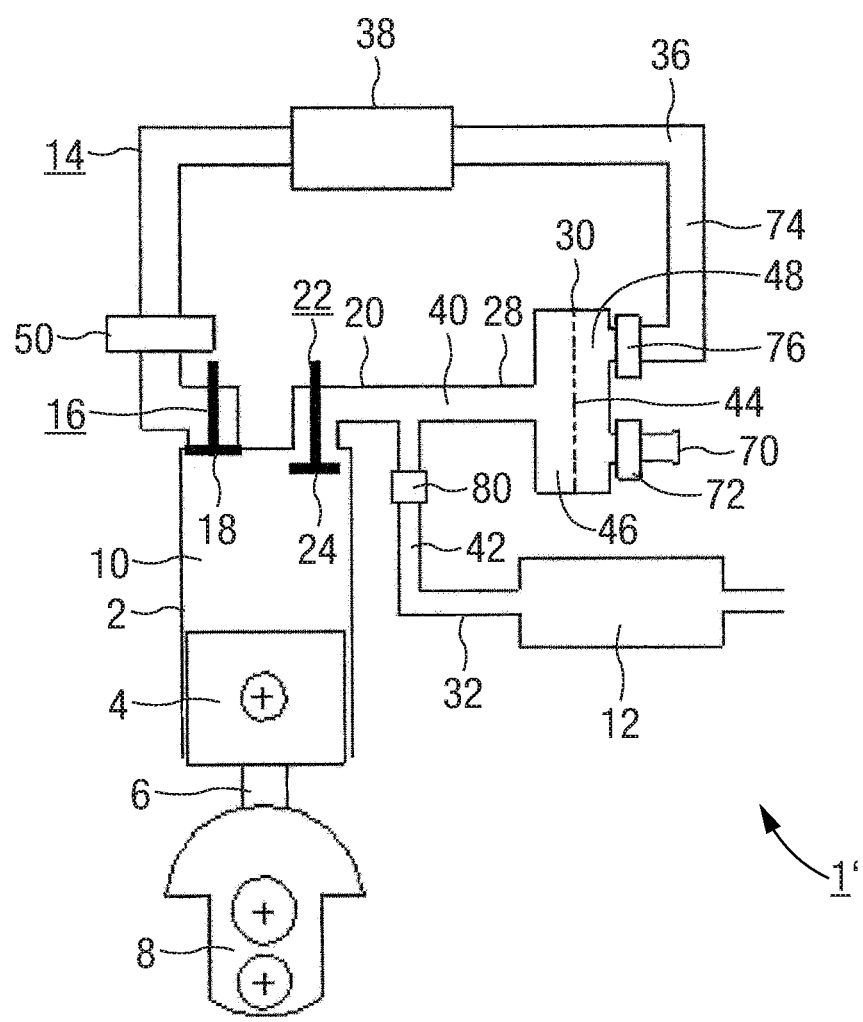

The alternative combustion engine 1' shown in FIG. 3 is identical in construction to the combustion engine 1 of FIG. 1 for most components, but has a blocking valve 80 in the branching point region between the primary duct 40 and the exhaust gas duct 42 instead of the pulse switch 26.

In the embodiment of FIG. 3, the cylinder 2 of the combustion engine 1' is likewise shown at the moment when the working piston 4 is at bottom dead centre (BDC) and the outlet cycle of the cylinder 2 is beginning. The outlet valve 24 has begun to open and exhaust gas is flowing into the exhaust gas tract 20, which branches, one tract thereof leading to the blocking valve 80 and the other tract thereof leading to the exhaust gas charge pump 30. The blocking valve 80 is actuated in such a way that it closes the exhaust gas line 32 to the exhaust 12 or silencer, which releases the exhaust gas into the open air, shortly after the outlet valve 24 opens. During this time, in other words the first cycle phase of the outlet cycle, in which the outlet valve 24 is opened and the blocking valve 80 is closed, the hot exhaust gas flows exclusively through the branch line 28 to the exhaust gas charge pump 30, where it is decompressed to provide power.

In the exhaust gas charge pump 30, the expansion work of the exhaust gas is converted into compression energy of the fresh gas guided in the fresh gas line 36. The exhaust gas charge pump 30 may be suitably configured for this purpose, for example as a bellows pump or the like. However, the configuration of the exhaust gas charge pump 30 as a membrane pump should be considered particularly advantageous and independently inventive and is provided in the embodiment. Therein, the exhaust gas expands by deformation of a membrane which separates the two volumes of exhaust gas and fresh gas from one another in a gas-tight manner. In the pressure-free state, the volume on the exhaust gas side or primary side of the exhaust gas charge pump 30 is at a minimum, and the volume on the fresh gas side is accordingly at a maximum. The extremely low mass of the membrane makes possible a very rapid change of volume in the exhaust gas pump 30 and accordingly a rapid decompression of the exhaust gas within a few crankshaft degrees, in such a way that the first cycle phase of the outlet cycle, provided for this purpose, can be kept correspondingly short.

Subsequently, this is followed in a time-delayed manner, approximately 20-60 crankshaft degrees after the outlet valve 24 is opened, by the second cycle phase of the outlet cycle, in which the exhaust gas still located in the primary side of the exhaust gas charge pump 30 and now decompressed therein, is passed back to the exhaust system 12 together with the remaining exhaust gas possibly still located in the combustion chamber 10 of the cylinder 2. For this purpose—after the provided decompression of the exhaust gas in the primary side of the exhaust gas charge pump 30, in accordance with the cycle—the blocking valve 80 is opened, in such a way that both the primary side of the exhaust gas charge pump 30 and the combustion chamber 10 are connected to the exhaust system on the gas side. Because of the rapid reactivity of the exhaust gas charge pump 30 configured as a membrane pump, for the currently conventional valve timings of combustion engines this start of the second cycle phase of the outlet cycle can take place comparatively early, in such a way that the blocking valve 80 is already opening the exhaust gas line 26 to the silencer or to the exhaust system 12 even in the region before the bottom dead centre (BDC) of the engine piston and the exhaust gas residual pressure in the cylinder 2 can be decompressed rapidly.

For both shown variants, the fresh gas compressed by the exhaust gas charge pump 30, which is now located in the fresh gas pressure duct 74, can now be used for increasing efficiency in various particularly preferred applications. The following examples are described by way of the particularly preferred variant of FIG. 1, but are each naturally also possible in the variant shown in FIG. 3.

1. Method for Positive Scavenging Gradients (Reduced Consumption)

In accordance with the embodiments shown in FIG. 1, 3, the compressed fresh gas flowing out of the exhaust gas charge pump 30 is passed through the fresh gas pressure duct 74 to the inlet valve 18 of the engine. The charge air cooler 38 may optionally be provided. After being compressed in the exhaust gas pump 30, in other words after the first cycle phase of the outlet cycle, the compressed fresh gas temporarily remains in the fresh gas pressure duct 74, including the charge air cooler 38, over approximately 180 crankshaft degrees in the region of the TDC of the working piston 4, until the load change at top dead centre (TDC) for which the inlet valve 18 is opened. The fresh gas duct 74 is thus used as a buffer for the compressed fresh gas in this phase. When the inlet valve 18 is opened, the fresh gas flows—initially under compression pressure—into the combustion chamber 10 of the cylinder 2, where it is decompressed as the working cylinder 4 descends to BDC, this also being accompanied by cooling (expansion cooling) of the fresh gas. As a result of the marked positive scavenging gradient, significant positive power is provided at the working cylinder 4 during the cylinder filling, instead of having to apply a negative suction power during the suction stroke as is conventional in suction engines. If the fresh gas delivery rate of the exhaust gas charge pump 30 is as large as the suction capacity of the suction power of the suction engine, there is no increase in the supply level of combustion air, meaning that the engine power remains unchanged from the configuration as a suction engine.

In a particularly advantageous configuration, the level of the available exhaust gas enthalpy, the ratio of the engine stroke volume to the delivery volume of the exhaust gas charge pump 30, and the storage volume of the fresh gas pressure duct 74 including the optionally provided charge air cooler 38 are individually tuned to one another. As a tendency, for a high exhaust gas enthalpy supply (for example low-compression engines) a large delivery stroke volume of the exhaust gas charge pump 30 can be combined with a comparatively small storage volume of the fresh gas pressure duct 74, meaning that a correspondingly large withdrawal of enthalpy in the exhaust gas is not converted into an increase in the air efficiency, but instead into an increase in the compression end pressure in the fresh gas pressure duct 74. In this case (constant air efficiency, relatively high compression pressure), the exhaust gas charge pump 30 is operated closer to the pump limit thereof. Therefore, a reduction of the storage volume in the fresh gas pressure duct 74 would be expedient in particular in partial-load operation of the combustion engine 1, since in these load ranges at least the petrol engine is operated almost exclusively using air volume control. A variable storage volume may for example and in an advantageous configuration be achieved by way of a plurality of line portions, which can be blocked individually, or by way of variable volumes in line components which can be configured variably in volume capacity by way of displaceable fixtures (for example displaceable piston cylinder units).

A reduction in air volume for partial-load operation of petrol engines, without efficiency-reducing throttling of the exhaust gas charge pump fresh gas supply, can also be achieved by prematurely ending the fresh gas supply to the engine during the suction stroke (Miller method). Valve drives having a variable inlet closing, air cycle valves, etc. can take on this function.

Because of the fundamentally increased scavenging pressure of fresh gas in TDC load change (TDCLC), the valve overlap phase of the engine may be greatly reduced in terms of the required time cross sections by comparison with operation without the exhaust gas charge pump 30. Above all, undesired return displacement of exhaust gas (negative scavenging gradient) into the inlet region of the engine is prevented or greatly reduced even at partial load.

2. Method for Positive Scavenging Gradient and Charging (Reduced Consumption and Increased Power)

This method is largely identical to the above-described method (positive scavenging gradient) in terms of system structure and mode of operation, but is operated in an independently inventive configuration using an exhaust gas charge pump 30 having a larger fresh gas delivery volume than that represented by the suction capacity of the combustion engine 1. The higher air efficiency of the exhaust gas charge pump 30 leads to a higher supply level of fresh gas in the engine, since in the region of the BDC at the end of the suction cycle thereof there is still an overpressure in the fresh gas pressure duct 74, and this is accompanied by an increase in charge density. As well as the positive scavenging gradient over the suction stroke as a whole, which indicates positive piston work, an increase in torque or power is thus also brought about by an increase in charge density. If it is now intended to leave the power of the engine unchanged, this method can be combined with a reduction in cylinder capacity (downsizing) of the engine, meaning that lower wall heat losses, friction and weight act to reduce consumption.

3. Method for Exclusive Charging (Increase in Torque and Power)

In the alternative embodiment shown schematically in FIG. 4, considered independently inventive, of the combustion engine 1", the exhaust gas charge pump 30 is exclusively provided for charging (increasing the density of the fresh gas charging). The primary difference from the above-described alternative lies in the configuration of the fresh gas supply of the combustion engine 1". In this case, the fresh gas pressure duct 74 opens into the actual engine inlet duct 81, which in turn opens on the outlet side into the combustion chamber 10 in a blockable manner via the inlet valve 18, and which additionally has a further connection to the ambient air supply 82 (air filter) at the inlet side, as is conventional in suction engines. In the engine inlet duct 81, a valve 84, which in the manner of a check valve is configured exclusively to allow a gas flow into the cylinder 2 but not in the reverse direction, is arranged upstream from the opening point of the fresh gas pressure duct 74 in the inflow direction of the gas, and particularly preferably as close as possible to the inlet valve 18. The valve 84 is advantageously configured as a self-regulating check valve (reed valve).

The fresh gas pressure duct 74 is in turn connected via a controllable fresh gas valve 86 to the engine inlet duct 81, the fresh gas valve 86 exclusively releasing the compressed air from the exhaust gas charge pump 30 into the duct portion 88 downstream from the valve 84. The duct portion 88 thus serves as a buffer for the compressed air flowing out of the exhaust gas charge pump 30. The fresh gas valve 86 is particularly preferably positioned as close as possible to the inlet valve 18.

The load change in the exhaust gas charge pump 30 is completed in this variant in the same way as in the above-described method. The fresh gas compressed close to the TDC of the engine is buffered in the fresh gas pressure duct 74 as long as the fresh gas valve 86 remains closed. When the suction phase of the engine now begins after TDCLC, ambient air is sucked into the combustion chamber 10 of the cylinder 2 via the valve 84 and the engine inlet duct 81 as in a conventional suction engine, until in the region of the BDCLC there is no longer any significant air throughput from the environment. At this time, the fresh gas valve 86 opens, and the compressed air from the fresh gas pressure duct 74 flows into the duct portion 88 downstream from the valve 84. Together with the accompanying rise in pressure, the check valve 84 closes, and compressed air flows exclusively into the cylinder 2 until it is in pressure equilibrium with the duct portion 88 and the fresh gas pressure duct 74 or the closing inlet valve 18 prevents any further flow.

In an advantageous configuration, the volume of the duct portion 88 downstream from the valve 84 is kept comparatively small, particularly preferably at approximately 10-20% of the engine stroke volume, so as to bring about as small a fall in pressure as possible in the charge phase at the inlet end in the event of a sufficient scavenging volume during TDCLC. The pressure of the stored air cushion in the inlet duct region when the inlet is closed falls rapidly in the next scavenging process as a result of the low storage volume and therefore indicates only slight positive piston work.

The fresh gas valve 86 closes when the inlet valve 18 is closed, and remains closed until the end of the following suction phase.

Successively earlier opening of the fresh gas valve 86 into the suction phase of the engine makes it possible for this method for exclusive charging to transition incrementally into the method for positive scavenging gradient and charging (reduced consumption and increased power). In a particularly advantageous configuration, the opening and closing times of the fresh gas valve 86 can be set variably. In this way, a load control in terms of the air volume can be provided in a particularly simple manner and with high efficiency.

Since there is hardly any piston movement close to the BDCLC, the pressure rise in the cylinder also does not provide or absorb any significant piston work.

As a matter of principle, the fresh gas in the duct portion 88 remains at the pressure level which was present at the end of the preceding suction phase during inlet closure. In particular at high loads, a considerable overpressure occurs here, and, during subsequent valve overlap during TCDLC, makes effective residual gas scavenging possible and thus positively influences the engine power.

This charging method exploits the exhaust gas enthalpy converted in the exhaust gas charge pump 30 in so far as possible to increase charge density (to increase power), and is therefore suitable in particular for engines which for constructional or physical reasons cannot be increased in power by increasing the cylinder capacity or rotational speed.

Since only part of the fresh air volume required by the engine has to be compressed by the exhaust gas charge pump 30, the exhaust gas charge pump 30 and likewise also the components for charge air cooling can be dimensioned smaller than would be required for a configuration for the entire air throughput of the combustion engine 1. The smaller component sizes and accompanying reductions in weight of these components become particularly advantageous in particular in weight-optimised and space-optimised vehicle engines or even aircraft engines. The method for exclusive charging or boost charging for a previously provided suction stroke can particularly advantageously take place on a two-cylinder four-stroke engine having 360° ignition spacing. This engine type may selectively be operated using a shared exhaust gas charge pump 30 or one assigned to each cylinder. The fresh gas line 36 of the exhaust gas charge pump 30 is connected to both cylinders. In each compression stroke of the exhaust gas charge pump 30 in the region of the BDC of the expanded cylinder, the adjacent cylinder carries out the end of the suction stroke thereof. Precisely in this time interval, fresh gas is pushed into the fresh gas line 36 by the exhaust gas charge pump 30, and is displaced into the cylinder without delay by the still open inlet valve of the adjacent cylinder as a boost charge. This method is completed every 360 crankshaft degrees in the alternation of the cylinder. If two exhaust gas charge pumps 30 are used, in other words one for each cylinder, the fresh gas lines 36 for the desired boost charging effect are each guided to the adjacent cylinder so as to take the phase difference into account in the operation cycle.

4. Method for Driving a Separate Expansion Machine

In an alternative particularly preferred embodiment, as shown for example in FIG. 5, the enthalpy drawn from the exhaust gas in the exhaust gas charge pump 30 is exploited to drive a separate expansion machine 90. Accordingly, in this independently inventive variant, the fresh gas charged in the exhaust gas charge pump 30 on the enthalpy side is decompressed in the expansion machine 90 to provide power. The schematic drawing of the alternative combustion engine 1' in FIG. 5 shows how the compressed fresh gas generated by the exhaust gas charge pump 30 is not supplied to the combustion cycle of the combustion engine 1''', but instead is decompressed in the separate expansion machine 90, for example a compressed-air engine, and thus converted into mechanical work. The expansion machine 90 may for example be configured as a vane engine which feeds its power directly into the combustion engine 1''' by way of coupling to an engine shaft (crankshaft 8, camshaft, etc.) of the combustion engine 1'''.

This system is very simple to control in terms of regulation, since the compressed fresh gas is passed from the exhaust gas charge pump 30 directly into the expansion machine 90 and does not have to be metered. Cooling of the compressed fresh gas can be omitted in most cases, and the length of the fresh gas pressure line 92 plays a subordinate role. In particular in partial-load engine operation, the exhaust gas enthalpy converted in the exhaust gas charge pump 30 can be passed through the expansion machine 90 in the form of unthrottled fresh gas flows.

In the above examples, the functionality of the exploitation of the exhaust gas enthalpy in the exhaust gas charge pump 30 was explained by way of integration into the gas guidance in 4-stroke engines. However, the exhaust gas charge pump 30 may also be operated on slot-controlled combustion engines, for example on slot-controlled two-stroke engines, rotary engines or rotary disc engines. In these cases, no inlet or outlet valves 18, 24 as such are provided, and the functionality of the gas inlet valve system 16 and the gas outlet valve system 22 is imitated by way of correspondingly arranged control slots in the cylinder casing. An embodiment for this variant of the invention is shown in the schematic drawing of FIG. 6 of a combustion engine 1' configured as a two-stroke engine.

In this embodiment, the outlet duct 94, which opens as a result of the downward movement of the working piston 4, is connected to the primary side of the exhaust gas charge pump 30 via the pulse switch 26 on the outlet side. As the working piston 4 descends, the exhaust gas is thus passed towards the primary side of the exhaust gas charge pump 30 for at least partial decompression in the first cycle phase of the outlet cycle. As the working piston 4 continues to descend, subsequently, in the second cycle phase, in other words after corresponding pulse transmission, the exhaust gas in the primary side of the exhaust gas charge pump 30 is decompressed further and escapes via the exhaust system 12.

In this embodiment, the compressed fresh air from the exhaust gas charge pump 30 is passed via the fresh gas pressure duct 74 to the overflow ducts 96, which upon opening blow the fresh gas into the cylinder 2 and scavenge the residual gas. The exhaust gas charge pump 30 can thus replace the generally conventional crankcase charge pump and make a crank drive with circulatory oil lubrication possible or additionally support the existing crankcase charge pump. In particular, the scavenging of the exhaust gas charge pump 30 and the scavenging of the crankcase charge pump may take place in temporal succession or with a phase offset in the cylinder via separate overflow ducts. This makes for example layer charging possible in the cylinder, so as to prevent scavenging fuel losses. For this purpose, at the start of the scavenging phase, exclusively fuel-free fresh air is displaced from the exhaust gas charge pump 30 into the cylinder towards the residual gas, until at a later time in the scavenging phase the overflow ducts which lead the fuel-air mixture from the crankcase pump into the cylinder open. This method of "air reservation" reduces fuel losses during scavenging (HO emissions) and further makes it possible to form the mixture in the engine using cost-efficient carburettor technology. Regardless of rotational speed, the exhaust gas charge pump 30 also takes on the function, assisting the load change, of the bulky resonance exhaust system which is otherwise conventional in two-stroke engines, without the rotational-speed-dependent resonance effects thereof.

In a preferred configuration, the expansion volume in the primary side in the exhaust gas charge pump 30 is between 30 and 300% of the cylinder stroke volume of the combustion engine 1. The low percentages preferably relate to combustion engines having low exhaust gas pressures (2-3 bar) in the outlet duct upstream from the exhaust gas charge pump or low air efficiencies (charging by boost charging). By contrast, large expansion volumes of the exhaust gas charge pump 30 can efficiently be combined preferably with high exhaust gas pressures (7-8 bar). The correspondingly provided high air efficiencies in the exhaust gas charge pump 30 can advantageously be exploited by way of a positive scavenging gradient with charging or else by way of a separate expansion machine.

The construction, considered independently inventive, of the exhaust gas charge pump 30 is described in greater detail by way of the cross-sectional drawing in FIG. 7. In principle, the exhaust gas charge pump 30 could actually be configured as a bellows pump or accordingly be configured with multi-part resiliently deformable separating units; however, in the configuration of FIG. 7, considered particularly preferred, it is configured as a membrane pump.

The exhaust gas charge pump 30 comprises a pressure housing 100, the internal volume 102 of which is subdivided, by way of a membrane 106 forming the resiliently deformable separating unit or intermediate wall 44, into a plurality—two in the embodiment shown—of sub-volumes 108, 110 separated from one another on the gas side.

The membrane 106 is thus located between a (primary-side) housing cover 112 on the primary gas side and a (secondary-side) housing cover 114 on the fresh gas side, which together form the pressure housing 100, as a resiliently deformable intermediate wall 44. It separates the two sub-volumes 108, 110 (primary side and secondary side), which extend between the membrane 106 and the curved inner faces 116, 118 of the two housing covers 112 and 114, from one another in a gas-tight manner. The first sub-volume 108 forms the primary side of the pump, and thus the primary volume 46 of the exhaust gas charge pump 30, within the meaning that the exhaust gas pulse is introduced into this volume and thus drives the pump. If exhaust gas is introduced directly into this primary volume 46, it is at a corresponding high temperature, and accordingly said primary side corresponds to the hot side of a membrane pump supplied with exhaust gas directly. In the present case, however, the gas pulse is preferably only introduced into the first sub-volume 108 serving as a primary volume 46 indirectly and via a gas cushion upstream therefrom, without hot exhaust gas having to flow in directly, in such a way that there is not necessarily a hot side. By contrast, the second sub-volume 110 is the gas chamber for the fresh gas to which the enthalpy is to be transferred, and thus forms the secondary side of the pump.

An additional radially peripheral seal 120 between the housing covers 112, 114 may be provided. The membrane 106 can be deflected under resilient deformation by application of pressure or by a force acting perpendicularly thereon. The inner faces 116, 118 of the two housing covers 112, 114 form the delimiting contact faces for the membrane 106 with maximum admissible membrane deflection in each direction. The membrane 106 provides an equal but opposite change in volume in the sub-volumes 108, 110 of the primary and secondary sides between the maximum deflections thereof.

It is considered particularly advantageous and independently inventive to contour the internal inner faces 116, 118, facing the membrane 106, of the two housing covers 112, 114. These are configured in such a way that they form, in a planar manner, the contact faces for the membrane 106 in each maximally deflected state, in such a way that in each of these states the membrane 106 is largely supported over virtually the entire area. Because of the contouring, which can be seen in particular in FIG. 7, the membrane 106 can roll along on the inner face 116 or 118 in question during a change in position or change in the deflection thereof, in such a way that operation which is particularly gentle on the material is possible. The rolling movement of the membrane 106 onto the inner face 116, 118 of the housing cover 112, 114 in question results in a continuous retardation of the membrane 106 until it is stationary, without an abrupt, hard stop in the final position thereof, and this is particularly favourable in particular to the service life of the relevant components.

A biasing force is applied to the membrane 106 mechanically in such a way that, in the pressure-free state, the sub-volume 108 provided for connection to the exhaust gas system of the combustion engine has a minimum value in the context of the deformability of the membrane 106. In this state, corresponding to FIG. 7, the membrane is thus largely in contact with the inner face 116, which is suitably contoured for this purpose and the progression of which is adapted to the membrane 106, of the housing cover 112 on the primary gas side. To provide said biasing force, in the embodiment of FIG. 7 a spring 122 (or if required a plurality thereof) is provided. This deflects the membrane 106 from the tension-free central position thereof towards the inner face 116 of the housing cover 112 in the pressure-free state. The biasing force of the spring(s) 122 is selected to be greater than the restoring force of the maximally deflected membrane 106, in such a way that in the state without application of gas pressure the membrane 106 is positioned fully deflected on the inner face 116 of the housing cover 112. The spring 122 is in turn supported on the housing cover 114 on the secondary gas side and via a spring plate 124 which is rigidly connected to the membrane 106.

At least one exhaust gas duct 126, through which exhaust gas or the gas column used for impulse transmission can flow into and out of the sub-volume 108 of the primary side which forms the primary gas volume 46 of the exhaust gas charge pump 30, is arranged in the housing cover 112 on the primary gas side. The exhaust gas duct 126 is advantageously positioned centrally in the housing cover 112, so as to bring about rotationally symmetrical thermal loading and pressure propagation at the membrane 106. So as to prevent any frontal flow of hot exhaust gas onto the membrane 106 through the exhaust gas duct 126 and to reduce the local thermal loading in the centre of the membrane, in an advantageous configuration a heat shield 130, on which the inflowing exhaust gas is deflected radially into the opening sub-volume 108 of the primary side, is applied—preferably centrally—to the membrane 106. The heat shield 130 is advantageously connected jointly to the spring plate 124 and to the membrane 106. The contact face of the heat shield 130 facing the membrane 106 is positioned on the membrane 106 only in part for the purpose of low heat transmission thereto.

At least one fresh gas suction duct 70 and at least one fresh gas pressure duct 74 lead to the second sub-volume 110 forming the secondary side of the exhaust gas charge pump 30, and accordingly through the housing cover 114 delimiting said sub-volume. They are respectively equipped with check valves (reed valves) 132, 134, in such a way that a gas flow can exclusively take place into the sub-volume 110 of the secondary side of the exhaust gas charge pump 30 in the fresh gas suction duct 70 and can exclusively take place out of the sub-volume 110 of the secondary side in the fresh gas pressure duct 74. For a high compression ratio on the secondary side, the check valves 132, 134 are preferably attached as close as possible to the inner face 118 of the housing cover 114, so as to keep the remaining volume (harmful volume) between the membrane 106 and the check valves 132, 134 as small as possible when the membrane 106 is deflected onto the inner face 118. In an advantageous configuration, the opening of the fresh gas suction duct 70 in the housing cover 114 is positioned in such a way that upon flowing into the exhaust gas charge pump 30 the fresh gas flow strikes the membrane 106 at the hottest surface portion thereof, in other words generally opposite the exhaust gas duct 126. In this way, the supplied fresh gas can be used for the purpose of cooling the membrane 106 in the most strongly thermally loaded region thereof. Advantageously, in particular so as to limit any heat flow from the exhaust gas side to the fresh gas side, a thermal insulation element 136 is additionally provided between the housing covers 112, 114, and in the embodiment is formed by a peripheral material inlay having low thermal conductivity and positioned between the housing edges and/or may be implemented geometrically by way of as reduced a mutual contact area of the housing covers as possible.

In the rest state, the membrane 106 is maximally deflected onto the primary side as a result of the bias, and the sub-volume 108 of the primary side is at a minimum. By contrast, on the secondary side, the corresponding sub-volume 110 is maximally filled with fresh gas. If the primary side is now supplied with exhaust gas under pressure (or the gas cushion) from the combustion engine though the exhaust gas duct 126, the membrane 106 moves towards the secondary side and urges the fresh gas stored in the sub-volume 110 of the secondary side through the check valve 134 into the fresh gas pressure duct 74 under pressure, until the membrane 106 is in contact with the inner face 118. If the gas pressure on the primary side is subsequently decompressed (for example as a result of the exhaust gas wave flooding back), the membrane 106 is pressed back onto the inner face 116 by the spring 122 and the initially present membrane restoring force. The gas on the primary side is completely ejected, and simultaneously the increasing sub-volume 110 on the secondary side is filled with fresh gas through the fresh gas suction duct 70. The energy stored in the compressed spring 122 is thus used for the load change (ejecting exhaust gas and sucking in fresh gas) in the exhaust gas charge pump 30.

The mechanical component loading can be kept comparatively low, in such a way that a long service life of the system can be achieved by simple means. In a preferred configuration, the inner faces 116, 118 are formed in cross section as curved paths, onto which the membrane 106 rolls, from the outer edge thereof to the membrane centre, when deflected, and thus does not stop abruptly. In a further advantageous configuration, the curved paths are adapted in terms of shape to the material properties and geometric properties of the membrane 106, in such a way that the mechanical load on the membrane 106 is distributed as uniformly as possible over the area thereof and the fatigue strength limits of the membrane material (depending on the material temperature) are not exceeded.

The membrane 106 and the spring 122 are preferably exclusively resiliently deformed; there are no sliding movements. The exhaust gas charge pump 30 thus manages completely without liquid lubrication (oil lubrication).

In a tribologically advantageous manner, the inner faces 116, 118 and/or the surfaces of the membrane 106 may be impregnated with a dry lubricant such as graphite or PTFE so as to achieve better rolling properties of the membrane 106 during contact with the inner surfaces 116, 118 of the housing covers 112, 114.

In the embodiment of FIG. 7, the exhaust gas charge pump 30 is provided with a single-piece membrane 106. This may be in the form of a planar, curved, corrugated or structured plate, but also as a multiply corrugated component, such as a bellows. A circular outer contour is advantageous, since it can be sealed favourably and reliably, but is not absolutely necessary.

In an alternative embodiment, also considered independently inventive, the exhaust gas charge pump 30 may also be formed as a membrane pump having a two-layer or multi-layer membrane. Examples of alternative exhaust gas charge pumps 30', 30" configured in this manner are shown in FIG. 8, 9 in cross section in each case. In each case, two membranes 140, 142 arranged mutually parallel form a double membrane 144. In the embodiments, the membranes 140, 142 are in each case rigidly coupled together via an optional connecting element or a spacer 146, and now separate the internal volume 102 of the pressure housing into three sub-volumes 108, 110, 148, specifically into the sub-volumes 108 and 110, provided in an unchanged manner on the primary and secondary sides, and now also additionally the third sub-volume 148 positioned in between.

Thus, one side of the membrane 140 seals the sub-volume 108 on the primary gas side, which serves as the exhaust gas chamber or primary side of the exhaust gas charge pump 30', 30", and in a corresponding manner the membrane 142 seals the sub-volume 110 on the secondary gas side, which serves as a fresh gas chamber or secondary side of the exhaust gas charge pump 30', 30". A biasing force, for example again generated by a spring 122, presses on the membrane 142, which in turn passes this movement on to the membrane 140 via the spacer 146 until the membrane 140 has achieved the maximum deflection thereof by way of contact with the inner wall 116 of the housing cover 112. The functionality of the load change of the exhaust gas charge pump 30', 30" having a double membrane is identical to the construction having a single membrane. The space between the membranes 140, 142, in other words the third sub-volume 148, is filled with gas, preferably with air, and thus forms a very good thermal insulation between the membranes 140, 142, in such a way that heating of the fresh gas side in the exhaust gas pump 30' as a result of heat input from the membrane 140 loaded with exhaust gas is virtually prevented. In the embodiment of FIG. 8, the double membrane 144 is formed comprising membranes 140, 142 which contact and touch one another in the outer region, whilst the membranes 140, 142 in the embodiment of FIG. 9 are still arranged spaced apart in the outer region; the distance between the membranes 140, 142 is set by way of a peripheral spacer 149.

As is shown in FIG. 8, 9, the spacer 146 is arranged preferably centrally between the membranes 140, 142, particularly preferably coaxially with the spring 122. However, a plurality of spacers may also be arranged between the membranes 140, 142. The spacer or spacers 146 may for example be formed as washers or tube portions. Advantageously, the spacers 146 are positioned on the membranes 140, 142 via an interposed resilient washer of a larger diameter so as to reduce the contact pressure and so as to give the membrane 140, 142 additional reinforcement during flexure in this region. For very small membrane spacings, exclusively resilient washers may even be provided as spacers 146. The spacers 146 are preferably held immovably in position and may for example be riveted, screwed or generally positively fixed to the membrane 140, 142.

The membranes 140, 142 need not necessarily be the same size, but may instead have different external diameters, including corresponding housing covers. By way of this geometric variation, in a particularly advantageous development different delivery volumes may be provided on the primary and secondary side of the exhaust gas charge pump 30', 30". If the membrane diameter, and thus also the pump volume, of the fresh gas side is smaller than that of the exhaust gas side, the fresh gas can be compressed to a higher pressure level, and this may for example be desirable for applications which have a high exhaust gas enthalpy potential but do not require high air efficiency or even require reduced air efficiency. In the converse application situation, a tendency towards a high fresh air throughput at a low pressure level could be achieved by way of a small exhaust gas-side and larger fresh-gas-side membrane 140, 142 in the case of a low exhaust gas enthalpy supply.

The double membrane arrangement, in particular comprising a spacer, is found to be particularly advantageous for suppressing any kinking or wave formation which may occur when the membrane moves as a result of the tension-free central passage thereof. To prevent wave formation in the single membrane, as is shown in the embodiment of FIG. 10, a linear guide 150, which is guided in one of the housing covers 112, 114, may for example be fixed to the membrane 106. Advantageously, this linear guide 150 is located on the fresh air side of the exhaust gas charge pump 30 and is made self-lubricating. Alternatively, a protective washer, which counters asymmetrical deformation of the membrane 106, can be fixed around the spring plate of the membrane 106.

In all the variants mentioned, the housing covers 112, 114 of the exhaust gas charge pump 30, 30', 30" may be formed very thin-walled, and thus also be produced cost-efficiently as a shaped sheet forming part. The connecting plane of the housing covers 112, 114 is advantageously parallel and close to the clamping plane of the membrane 106. Heat-resistant and corrosion-resistant steels are preferably used as materials at least for the exhaust gas or primary gas side, it also being possible to consider aluminium materials in the case of corresponding cooling. On the fresh gas side, aluminium may advantageously be selected for good thermal conduction.

By contrast, if, as is particularly preferably provided, the exhaust gas charge pump 30, 30', 30" is driven by the exhaust gas pressure waves via a branch line 28 of an appropriate length and/or volume, the thermal decoupling of the exhaust gas charge pump 30, 30', 30" from the hot exhaust gas advantageously prevents significant heating of the exhaust gas charge pump 30, 30', 30" and thus also undesired heating of the fresh gas in the exhaust gas charge pump 30, 30', 30". The low operating temperature level of the exhaust gas charge pump 30, 30', 30", which can be achieved in this manner, likewise makes possible the particularly preferably provided use of plastics materials as the material for the housing parts 112, 114. This provides a weight and cost reduction by comparison with metal materials, whilst in addition improved acoustic properties can also further be achieved and greater freedom of shaping is possible. For the housing parts 112, 114, thermoplastic materials are particularly preferably provided for injection moulding. For low emission of structure-borne sound, the housing components 112, 114 may be made in a sandwich construction or be encased in sound-insulating materials.

Each membrane 106, 140, 142 is preferably, in particular in the case of an appropriately low operating temperature, also made of plastics material or plastics material composite materials (rubber, polyetheretherketone, polyetherimide, polyamide, etc.). These have some decisive advantages over metal materials. The generally lower weight thereof advantageously increases the natural frequency of the membrane, the lower modulus of elasticity of plastics materials makes possible a greater deflection of the membrane, and thus a greater delivery volume per stroke, for the same surface load (force or pressure). Since plastics material membranes are generally lighter than metal membranes, the plastics material membranes can receive a higher kinetic energy during impulse transmission. Thermoplastic materials in particular have a high fatigue bending load, and in combination with fibre reinforcement, such as glass fibres, form highly resilient but also tear-resistant composite materials.

Depending on the operating temperature level of the exhaust gas charge pump 30, 30', 30", the material selection of the housing or membrane may be based exclusively on metal materials in the case of high temperatures or consist of plastics materials in the case of low temperatures. Mixed constructions are also conceivable, such as metal materials for the exhaust gas side and plastics materials for the fresh air side.

If the exhaust gas pump 30, 30', 30" is operated at a temperature level of 100° C. or lower, condensate can form from the steam contained in the exhaust gas when the exhaust gas pressure wave is decompressed in the exhaust gas charge pump 30, 30', 30". In particular in the use situation where the exhaust gas pump 30, 30', 30'; is not positioned in an appropriate location from which condensate can flow back into the exhaust gas line, an advantageous development provides a condensate drain so as to prevent accumulation of condensate in the primary volume 46 of the exhaust gas charge pump 30, 30', 30". This condensate drain is advantageously attached to the lowest point of the primary gas side of the exhaust gas charge pump 30, 30', 30" so as to exploit the gravitational force of the condensate. To prevent exhaust gas from escaping through the condensate drain, it can be made gas-tight, for example by way of a liquid-controlled float valve.

In consideration of the load change on the fresh gas side of the exhaust gas charge pump 30, 30', 30", it should be noted that for example for a single-cylinder four-stroke engine cycle the compression of the fresh gas in the exhaust gas charge pump 30, 30', 30" at the nominal rotational speed of the engine is only approximately 40 crankshaft degrees, but the suction process may therefore last up to 680 crankshaft degrees (720°-40°=680°). In other words, the available time for sucking in fresh gas is nominally approximately 17 times longer than the compression and ejection time. This ratio of the scavenging times should preferably be approximately inversely proportionally reflected in the scavenging cross-sectional areas of the check valves 132, 134 and the duct cross sections in the ducts 70, 74 on the fresh gas side. Advantageously, the large scavenging cross sections in the region of the valve 134 for ejecting the compressed fresh gas are positioned approximately concentrically about the centre of area of the exhaust gas charge pump 30, 30', 30", since towards the end of the compression stroke the membrane 106 comes into contact with (rolls onto) the housing cover 114, radially from the outside to the inside, and the ejection of fresh gas close to the membrane centre is thus accompanied by smaller flow losses because of the larger distance of the membrane from the housing.

However, the preferred ratio of the scavenging cross sections fundamentally changes when a plurality of engine cylinders act on a shared exhaust gas charge pump 30, 30', 30". Whilst the compression stroke of the exhaust gas charge pump 30, 30', 30" remains virtually temporally unchanged, much less time is available for the suction process. For example, for a two-cylinder four-stroke engine having the same angular ignition spacing of 360 crankshaft degrees, there are still approximately 40 crankshaft degrees for the compression, but only 320 crankshaft degrees (360°-40°=320°) for the suction process. Taking into account the scavenging times of the exhaust gas charge pump 30, 30', 30" in the single-cylinder four-stroke engine, approximately 15-25 crankshaft degrees blow-down timing can be provided for the compression stroke and approximately 200-250 crankshaft degrees for the suction process.

The installation position of the exhaust gas charge pump 30, 30', 30" in the engine or in the vehicle has a high freedom of configuration because of the possibility of connecting the relatively long branch line 28. Thus, the exhaust gas charge pump need not be positioned in the direct vicinity of the cylinder head, but can also be attached in the region of the lower crankcase on the exhaust gas or suction side or even be positioned under the oil pan. Taking into account in particular the spatial relationships in the two-wheeled vehicle, it is found to be favourable to accommodate the exhaust gas charge pump 30, 30', 30" behind the engine above the transmission or in the frame triangle, in other words under the driver's seat. For narrower-construction engines, such as single-cylinder engines, the exhaust gas charge pump 30, 30', 30" may also be positioned laterally alongside the cylinder or even be integrated as a component into the valve cover of the cylinder head. The suction noise absorber, including the air filter element, can be combined with the housing cover 114 of the fresh air side of the exhaust gas charge pump 30, 30', 30" to form an assembly to save space and costs.

In addition to the inherent function thereof, the housing covers 112, 114 may be configured as heat exchangers, in that the outer faces thereof are for example exposed to a cooling airflow for example by way of ribbings or the outer faces are washed around by a cooling liquid. The heat withdrawal at the housing cover 112 on the primary side advantageously has the result that it also reduces the membrane working temperature, since the central exhaust gas temperature turns out lower and the heat flow from the membrane 106 to the housing cover 112 is higher because of the greater temperature difference. Heat withdrawal at the housing cover 114 on the secondary side takes on the function of charge air cooling, meaning that in some cases a separate downstream charge air cooler 38 can be omitted or alternatively it would be possible to achieve a higher total cooling power including the charge air cooler 38. The thermal power drawn from the exhaust gas charge pump 30 can in particular be used for heating purposes in the field of force-heat coupling.

The membrane 106 is preferably fixed between the housing covers 112, 114 in a targeted manner in view of the expected operating parameters. Particularly preferably, the component temperatures which occur in practice and the temperature differences thereof are taken into account, which may lead to changes in length in the components which are approximately two orders of magnitude greater than the change in length (expansion) of the membrane 106 due to the deflection thereof due to loading with gas pressure. To take this into account and suitably compensate the different thermal length extensions between the housing covers 112, 114 on the one hand and the membrane 106 on the other hand, in a particularly advantageous configuration the membrane 106 is positioned slightly radially displaceably, axially between the housing covers 112, 114. FIG. 11-19 show some possibilities for fixing the membrane, which are also each considered independently inventive.

Figure 11:
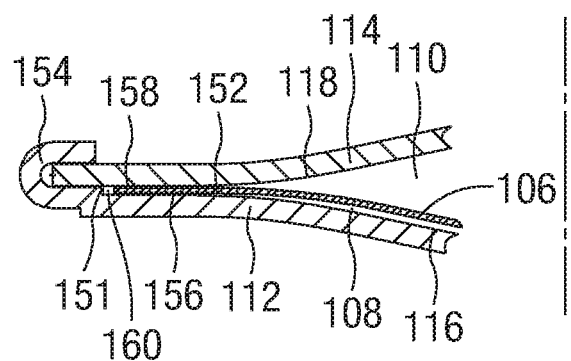

In the embodiment of FIG. 11, the planar membrane 106 is mounted axially fixed but slightly radially displaceable between the housing covers 112, 114. In the edge region thereof, the housing cover 112 is provided with a peripheral shoulder 151 which is slightly higher than the thickness of the membrane 106. The other housing cover 114 is positioned on this shoulder 151 so as to form an edge gap 152, and is for example pressed in here together with the housing cover 112 via the folded collar 154. The membrane 106 is thus radially displaceable onto the sliding sealing surfaces 156, 158 thus formed. The peripheral shoulder 151 is positioned in such a way that an annular gap 160 is formed between the shoulder 151 and the outer edge of the membrane 106 over the outer edge of the membrane 106. This annular gap 160, which in practice has a width of for example merely a few tenths of a millimeter, ensures that the membrane 106 can expand thermally unimpeded but is still centred sufficiently in the housing covers 112, 114.

Figure 12:
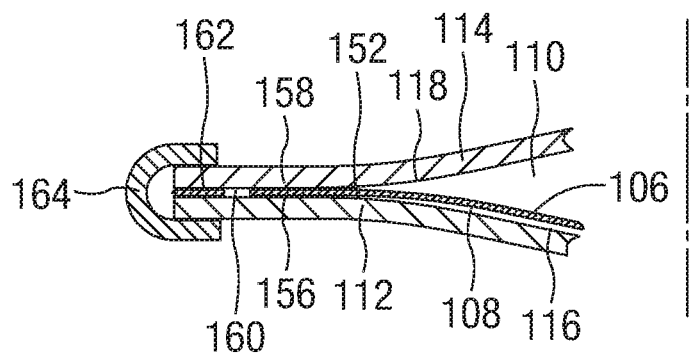

FIG. 12 shows a further configuration option for a radially movable membrane 106. In this embodiment, a spacer ring 162 is arranged between the housing covers 112, 114 in the edge contact region thereof. The functional principle of the membrane mounting via the sliding sealing surfaces 156, 158 remains unchanged, as disclosed above. The gas-tight interconnection of the two housing covers 112, 114 is established via a separate folded peripheral ring 164 in this case.

Figure 13:
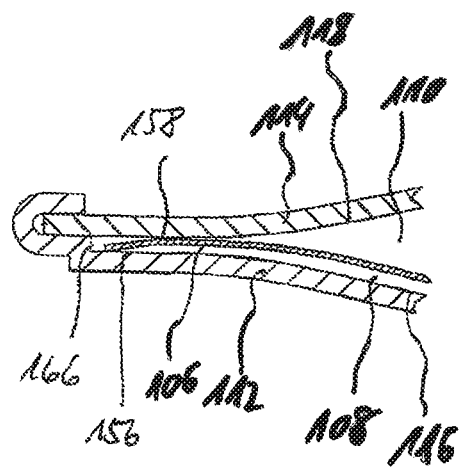

FIG. 13 shows a highly advantageous embodiment which is highly tolerant of faults in the manufacture of the housing covers 112, 114. A stepping 166 on the housing cover 112 is much higher than the thickness of the membrane 106, it being possible for example merely to produce the stepping 166 in a comparatively wide tolerance range by a thermoforming process or cutting post-processing. The contact of the membrane 106 with the sliding sealing faces 156, 158 is provided by a radially peripheral, slightly conical curvature of the membrane edge.

Figure 14:
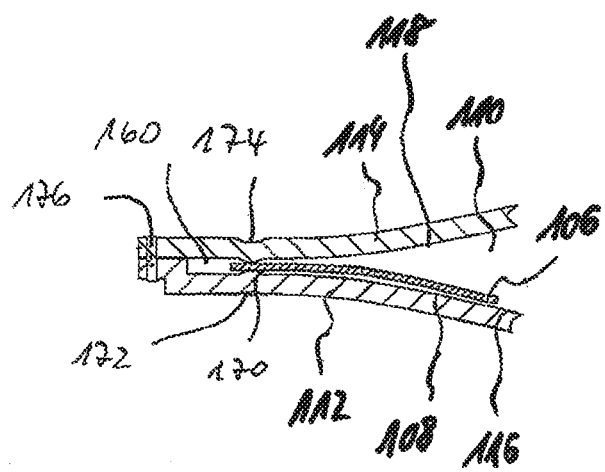
Figure 15:
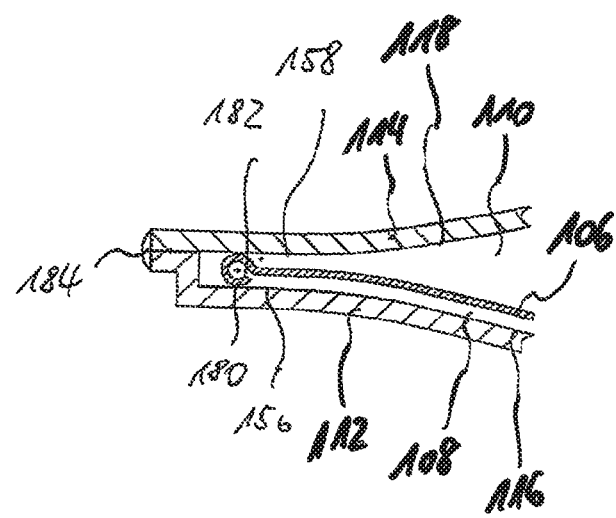

For an unchanged maximum level of material stress and size of the diameter of the membrane 106, the membrane stroke and thus the maximum delivery volume of the exhaust gas charge pump 30, 30' can be increased in that, in a particularly advantageous and also independently inventive configuration, the membrane 106 is not clamped in an axially plane-parallel manner as shown previously, but instead is mounted rotatably at the edge 170 thereof. This rotatability is based on an imaginary curved axle revolving together with the membrane edge. FIGS. 14 and 15 show embodiments of this particularly advantageous construction.

FIG. 14 shows the two housing covers 112, 114, each having a radially peripheral pleat 172, 174. The pleats 172, 174 receive the membrane 106 in the manner of tongs, but make it possible for the membrane 106 to carry out a rocking rotational movement during deflection, in such a way that the membrane edge undergoes a much smaller deformation. The annular gap 160 again makes thermal expansion differences between the components possible. In this case the two housing covers 112, 114 are for example interconnected via a plurality of rivets 176.

In the embodiment of FIG. 15, the rotatability at the membrane clamping is achieved by way of a curved border 180 of the membrane edge 182. The membrane 106 is thus positioned in a line shape on the sliding sealing faces 156, 158 and can carry out rolling movements thereon. In this case, the two housing covers 112, 114 are for example interconnected via a weld seam 184.

The membrane 106, 140, 142 is potentially a component under high thermal and mechanical loads. Therefore heat-resistant steels such as V4A, Hastelloy, Inconel, Duratherm, Nimonic, TiAl6V4, which as spring materials simultaneously have high creep limits and tensile strengths, are preferably provided as materials. In particular, materials having a low modulus of elasticity, such as titanium alloys, are advantageous, since as a result of the required restoration forces of the membrane 106, 140, 142 and thus also the required force of the spring 122 are reduced. Titanium alloys, with the relatively low density thereof, keep the mass of the membrane 106, 140, 142 low and thus keep the natural frequency of the oscillating system (membrane and spring) high.

The membrane thickness is particularly preferably selected in the range approximately between 0.3 and 1.0 millimeters. Comparatively thin membranes 106, 140, 142 are advantageous in terms of deformability, and thicker ones in terms of the thermo-mechanical load capacity. Therefore, a compromise between the material and the membrane thickness is preferably selected depending on the application.

A circular membrane shape has the advantage of a rotationally symmetrical load in terms of mechanical and thermal stress, but is not absolutely necessary.

Figure 16:
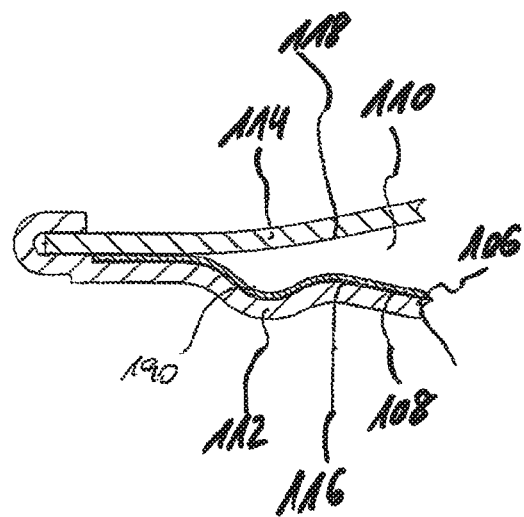
Figure 17:
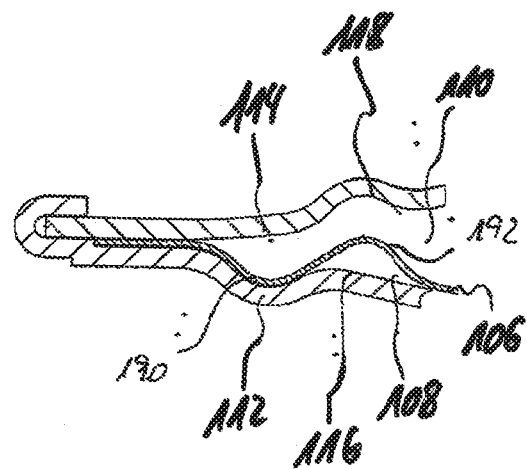

As a well as a circular outer membrane contour, a planar disc shape of the membrane 106, 140, 142 is a particularly simple and thus preferred configuration. Geometries of this type can cost-effectively be stamped or cut from sheet metal boards or rolls. The membrane 106, 140, 142 can be formed with radially peripheral pleats 190, 192, as is shown in FIGS. 16 and 17. One or more of these pleats 190, 192 may for example be formed in the membrane 106, 140, 142 by a thermoforming process. By self-deformation, the pleats 190, 192 reduce the radial tensions when the membrane 106, 140, 142 is deflected, in such a way that for an unchanged membrane diameter larger membrane strokes can be carried out. Also, the radially peripheral pleats 190, 192 can compensate the different thermal expansions between the membrane centre, the membrane edge and the housing covers 112, 114 by self-deformation, in such a way that the membrane edge can be pressed in firmly between the housing covers 112, 114 both axially and radially. This has advantages for particularly cost-effective manufacture of the exhaust gas charge pump 30, 30'.

Figure 18:
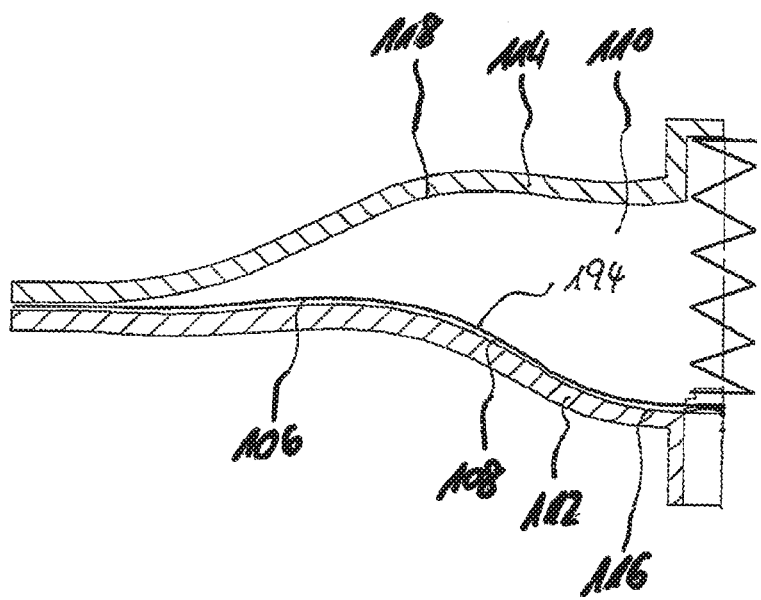

In the region of the pleats 190, 192, in a particularly advantageous configuration, the contours of the housing covers 112, 114 are suitably adapted at the inner surfaces 116, 118 thereof for freedom of movement of the membrane 106, 140, 142. The embodiment of FIG. 18 shows a membrane 106, 140, 142 in which merely one pleat 194 having a comparatively low curvature extends from the membrane centre to the clamping faces between the housing covers 112, 114. This pleat 194 has a very low inherent curvature along with correspondingly low internal stresses, in such a way that very high membrane strokes can be provided in this configuration. As a result of the large radii of the pleats themselves, the contours of the housing covers 112, 114 may be adapted to the membrane 106, 140, 142 without difficulty.

Figure 19:
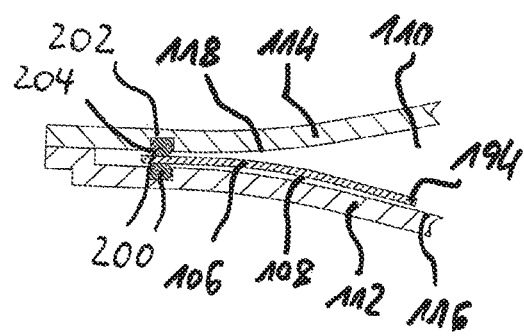

A particularly advantageous configuration for a rotatably mounted membrane 106, 140, 142 can be achieved by way of indirect clamping of the membrane 106, 140, 142 between the two housing covers 112, 114 via sealing rings 200, as is shown in the embodiment of FIG. 19. These sealing rings 200 are positioned in peripheral grooves 202 of the housing covers 112, 114 and protrude past the groove edge 204 in part. The sealing rings 200 may advantageously be in the form of O rings of a resilient material such as rubber of PTFE or the like, and in this configuration actually have a plurality of purposes. First, the circular cross section and also the resilience of the O rings may make rotatable clamping of the membrane 106, 140, 142 possible. Further, the membrane 106, 140, 142 may perform "flowing" movements between the O rings, whereby mechanical tensions from different thermal expansion between the membrane 106, 140, 142 and the housing covers 112, 114 are dissipated. In addition, resilient sealing rings 200 make flawless sealing and guidance of the membrane 106, 140, 142 possible, even when comparatively high manufacturing tolerances in the housing covers 112, 114 are taken into account.

LIST OF REFERENCE NUMERALS 1 combustion engine
2 cylinder
4 working piston
6 piston rod
8 crankshaft
10 combustion chamber
12 exhaust system
14 gas inlet system
16 inlet valve system
18 inlet valve
20 exhaust gas tract
22 outlet valve system
24 outlet valve
26 pulse switch
28 branch line
30 exhaust gas charge pump
32 exhaust gas line 36 fresh gas line
38 charge air cooler
40 primary duct
42 exhaust gas duct
44 resilient intermediate wall
46 primary gas volume
48 fresh gas volume
50 additional valve
60, 64 arrow
62 inflow region
66 annular duct
70 fresh gas suction duct
72 valve
74 fresh gas pressure duct
76 valve
80 blocking valve
81 engine inlet duct
82 ambient air supply
84 valve
86 fresh gas valve
88 duct portion
90 expansion machine
92 fresh gas pressure line
94 outlet duct
96 overflow duct
100 pressure housing
102 internal volume
106 membrane
108 sub-volume
110 sub-volume
112 housing cover on the exhaust gas side
114 housing cover on the fresh gas side
116 inner face
118 inner face
120 seal
122 spring
124 spring plate
126 exhaust gas duct
130 heat shield
132 check valve
134 check valve
136 insulating element
140 membrane
142 membrane
144 double membrane
146 spacer
148 sub-volume
149 spacer
150 linear guide
151 shoulder
152 gap
154 collar
156, 158 sliding sealing face
160 annular gap
162 spacer ring
164 peripheral ring
166 stepping
170 edge
172, 174 pleat
176 rivet
180 border
182 membrane edge
184 weld seam
190, 192, 194 pleat
200 sealing ring
202 groove
204 groove edge

The invention claimed is:

1. A method for operating a combustion engine, the method comprising the steps of:
    ejecting, during an outlet cycle of a cylinder of the combustion engine, exhaust gas located under pressure in the cylinder of the combustion engine from the cylinder and supplying the exhaust gas to an exhaust systems;
    transmitting, in a first cycle phase of the outlet cycle at least a portion of a pulse of the exhaust gas pressure wave flowing out of the cylinder to the primary side of an exhaust gas charge pump;
    converting, in a first cycle phase of the outlet cycle, the pulse into compression work to compress fresh gas on the secondary side of the exhaust gas charge pump;
    passing, in a second cycle phase of the outlet cycle, the exhaust gas to the exhaust system through a pulse switch without flowing through the exhaust gas charge pump; and
    supplying, in an inlet cycle of the cylinder of the combustion engine, the compressed fresh gas to the cylinder.

2. The method according to claim 1, in which in the first cycle phase of the outlet cycle,
    transmitting the at least a portion of the pulse of the exhaust gas pressure wave flowing out of the cylinder to a gas cushion; and
    subsequently decompressing the pulse of the exhaust gas pressure to provide power in the exhaust gas charge pump.

3. The method according to claim 1, in which
    converting an enthalpy of the exhaust gas into expansion work via/by the primary side of the exhaust gas charge pump; and
    converting at least a portion of the pulse of the exhaust gas pressure into compression work in a supplied fresh gas flow via/by the secondary side of the exhaust gas charge pump.

4. The method according to claim 3, in which
    supplying the fresh gas compressed by/via the exhaust gas charge pump to a buffer where the fresh gas is reserved for supplying to the combustion chamber of the cylinder.

5. The method according to claim 3, further comprising:
    decompressing the fresh gas compressed by the exhaust gas charge pump in an expansion machine to provide power.

* * * * *